United States Patent
Oda

(10) Patent No.: US 11,176,532 B2
(45) Date of Patent: Nov. 16, 2021

(54) ELECTRONIC DEVICE, INFORMATION PROCESSING APPARATUS, AND POS TERMINAL

(71) Applicant: NEC Platforms, Ltd., Kawasaki (JP)

(72) Inventor: Kazuhiko Oda, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 60 days.

(21) Appl. No.: 16/642,252

(22) PCT Filed: Aug. 3, 2018

(86) PCT No.: PCT/JP2018/029223
§ 371 (c)(1),
(2) Date: Feb. 26, 2020

(87) PCT Pub. No.: WO2019/049574
PCT Pub. Date: Mar. 14, 2019

(65) Prior Publication Data
US 2021/0073773 A1   Mar. 11, 2021

(30) Foreign Application Priority Data
Sep. 6, 2017   (JP) .............................. JP2017-170909

(51) Int. Cl.
*G06Q 20/20* (2012.01)
*G06K 7/14* (2006.01)
*H05K 5/00* (2006.01)

(52) U.S. Cl.
CPC ......... *G06Q 20/208* (2013.01); *G06K 7/1413* (2013.01); *G06Q 20/209* (2013.01); *H05K 5/00* (2013.01)

(58) Field of Classification Search
CPC ... G06Q 20/208; G06Q 20/209; G06K 7/1413
(Continued)

(56) References Cited

U.S. PATENT DOCUMENTS 5,594,617 A  *  1/1997  Foster ................... G06F 1/1616
                                                    361/679.02
5,933,812 A  *  8/1999  Meyer ....................... G07G 1/00
                                                         705/15
(Continued)

FOREIGN PATENT DOCUMENTS

CN        2455043 Y      10/2001
CN        1993666 A       7/2007
(Continued)

OTHER PUBLICATIONS

Indian Office Action for IN Application No. 202017013979 dated Jun. 9, 2021.
(Continued)

*Primary Examiner* — A. Hunter Wilder
*Assistant Examiner* — Nicole Elena Bruner
(74) *Attorney, Agent, or Firm* — Sughrue Mion, PLLC

(57) ABSTRACT

This electronic device has: a device body 10 that has a power switch 12; and a cover 20. The cover 20 has a cover body 21 that can be slid and removed, a switch window 24, a switch door 22, and a sliding member 23 that can slide from a first position located below to a second position located above. The device body 10 has a projection 10p. The sliding member 23 has a claw 23f. The lower end 22L of the switch door 22 comes into contact with the upper end 23U of the sliding member 23 when the door is closed, whereas contact with the upper end 23U ceases when the door is opened. A side surface 23fs of the claw 23f of the sliding member 23 comes into contact with a side surface 10ps of the projection 10p of the device body 10 when the sliding member 23 is at the first position, whereas contact with the side surface 10ps ceases when the sliding member is at the second position.

20 Claims, 21 Drawing Sheets

(58) Field of Classification Search
USPC .......................................................... 705/23
See application file for complete search history.

(56) References Cited

U.S. PATENT DOCUMENTS

| | | | | |
|---|---|---|---|---|
| 6,009,338 | A * | 12/1999 | Iwata | H04M 1/56 |
| | | | | 455/575.4 |
| 6,367,896 | B1 | 4/2002 | Peng et al. | |
| 6,629,636 | B1 * | 10/2003 | Hayashi | A47F 9/04 |
| | | | | 235/379 |
| 6,735,075 | B1 | 5/2004 | Lin | |
| 6,769,748 | B1 * | 8/2004 | Tamura | H05K 5/0013 |
| | | | | 312/223.1 |
| 2004/0061913 | A1 | 4/2004 | Takiguchi | |
| 2006/0198094 | A1 * | 9/2006 | Kano | G07G 1/0018 |
| | | | | 361/679.09 |
| 2007/0107923 | A1 | 5/2007 | Takizawa et al. | |
| 2009/0095504 | A1 * | 4/2009 | Kato | H05K 5/0247 |
| | | | | 174/135 |
| 2009/0096295 | A1 * | 4/2009 | Kato | H05K 5/0247 |
| | | | | 307/326 |
| 2010/0202113 | A1 | 8/2010 | Fushimi | |
| 2011/0050003 | A1 * | 3/2011 | Sekino | G06F 1/182 |
| | | | | 307/328 |
| 2011/0211300 | A1 * | 9/2011 | Mori | G06F 1/1656 |
| | | | | 361/679.01 |
| 2011/0249382 | A1 * | 10/2011 | Tsubota | H05K 7/20145 |
| | | | | 361/679.01 |
| 2012/0300427 | A1 * | 11/2012 | Gong | H05K 7/1487 |
| | | | | 361/807 |
| 2016/0207667 | A1 | 7/2016 | Denize | |
| 2018/0367740 | A1 * | 12/2018 | Ito | H04N 5/23203 |

FOREIGN PATENT DOCUMENTS

| | | |
|---|---|---|
| CN | 101631437 A | 1/2010 |
| CN | 102215656 A | 10/2011 |
| CN | 105579358 A | 5/2016 |
| JP | 10-208574 A | 8/1998 |
| JP | 2011-222730 A | 11/2011 |
| JP | 2012-178743 A | 9/2012 |
| JP | 2013-022136 A | 2/2013 |
| JP | 2013-097425 A | 5/2013 |
| JP | 5511742 B2 | 6/2014 |
| JP | 2014-143364 A | 8/2014 |
| WO | 2011/080117 A1 | 7/2011 |

OTHER PUBLICATIONS

International Search Report for PCT/JP2018/029223 dated Oct. 16, 2018 (PCT/ISA/210).
Written Opinion of the International Searching Authority for PCT/JP2018/029223 dated Oct. 16, 2018 (PCT/ISA/237).
Chinese Office Action for CN Application No. 201880057058.6 dated May 7, 2021 with English Translation.

* cited by examiner

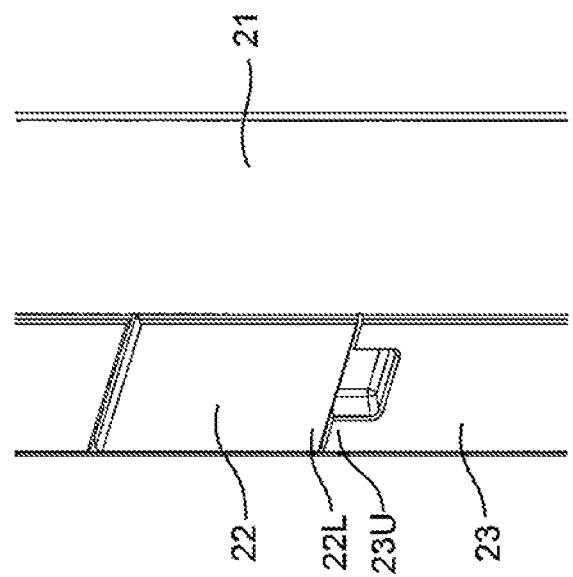
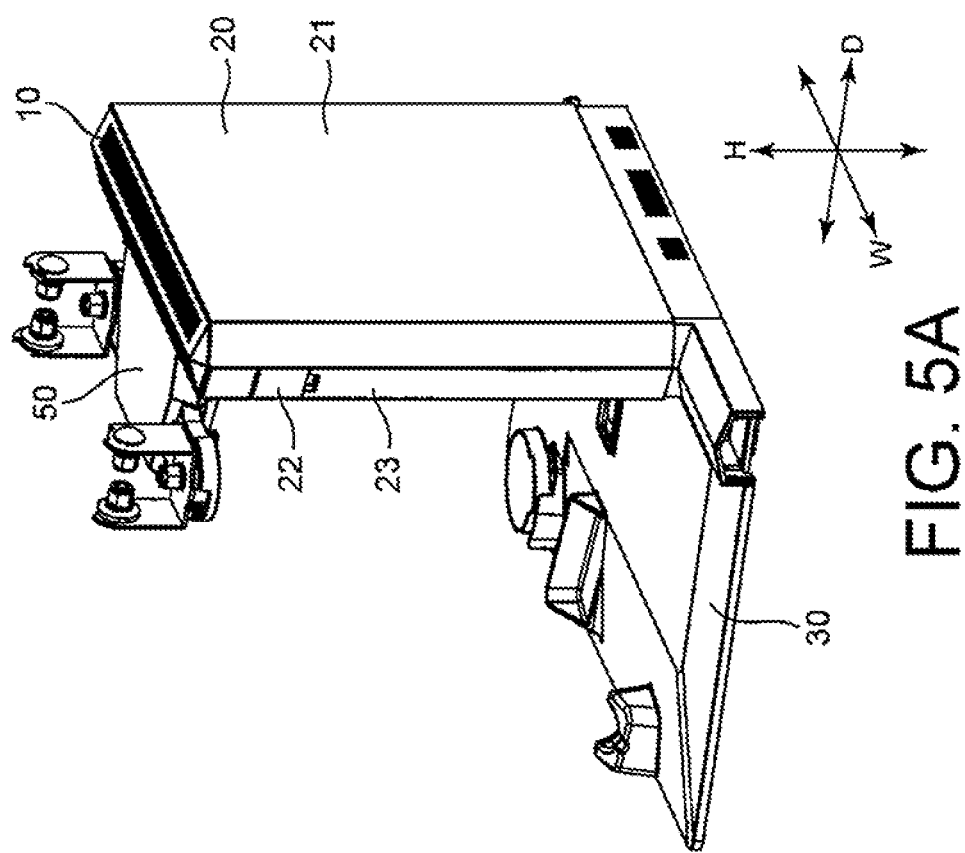

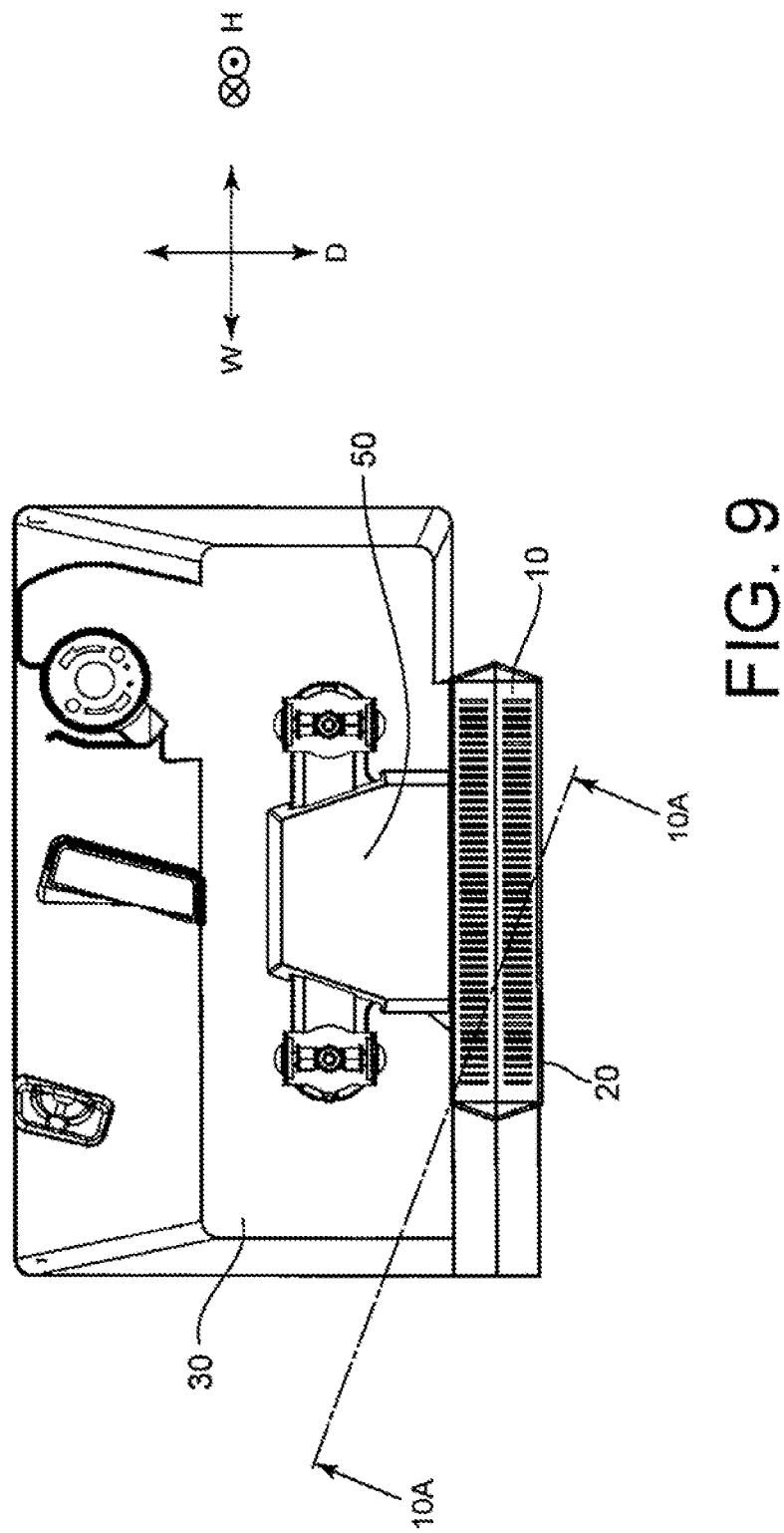

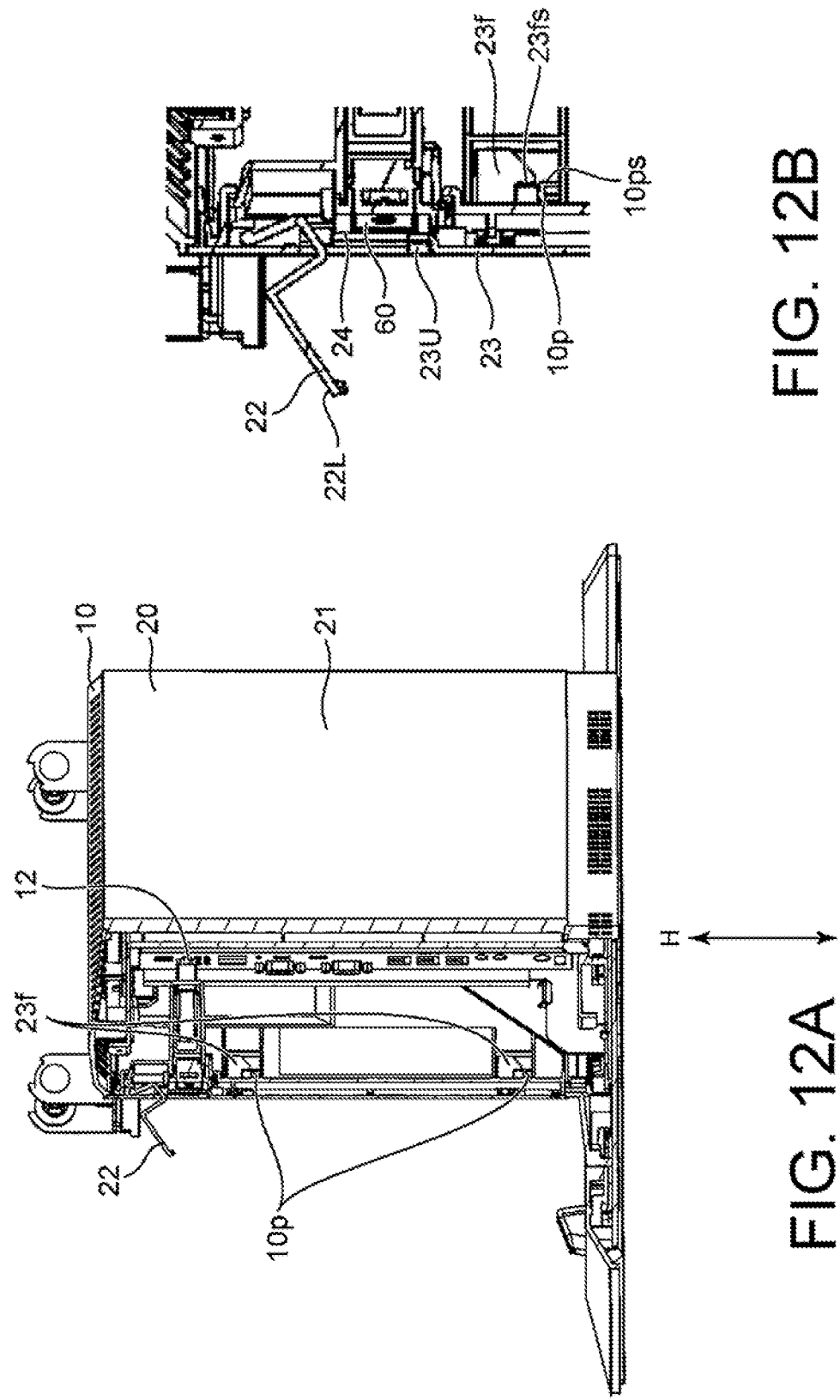

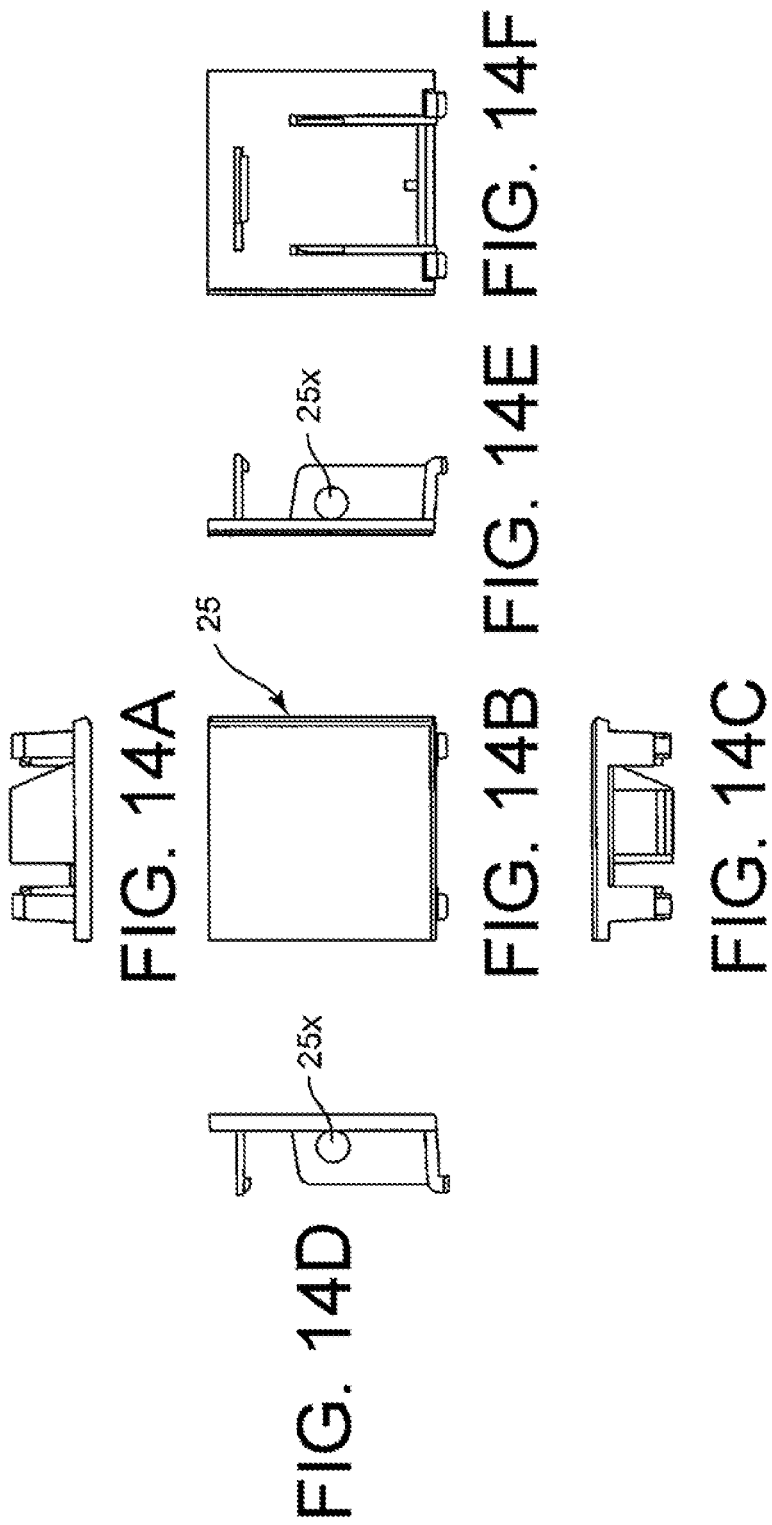

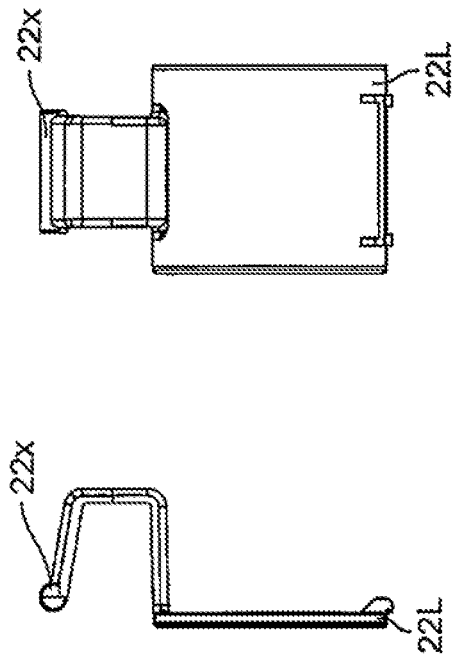

FIG. 16A
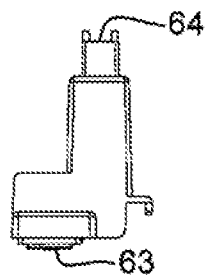
FIG. 16D  FIG. 16E
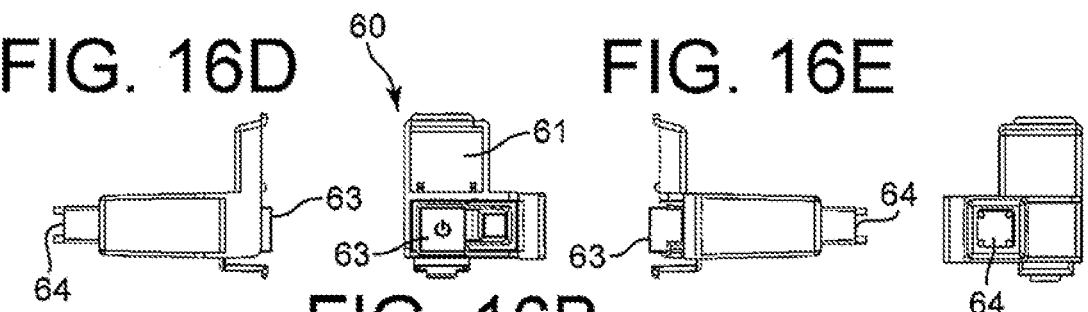
FIG. 16B
FIG. 16F
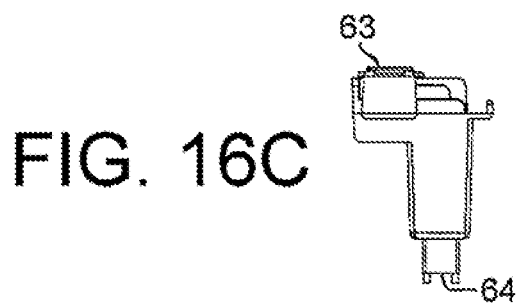
FIG. 16C
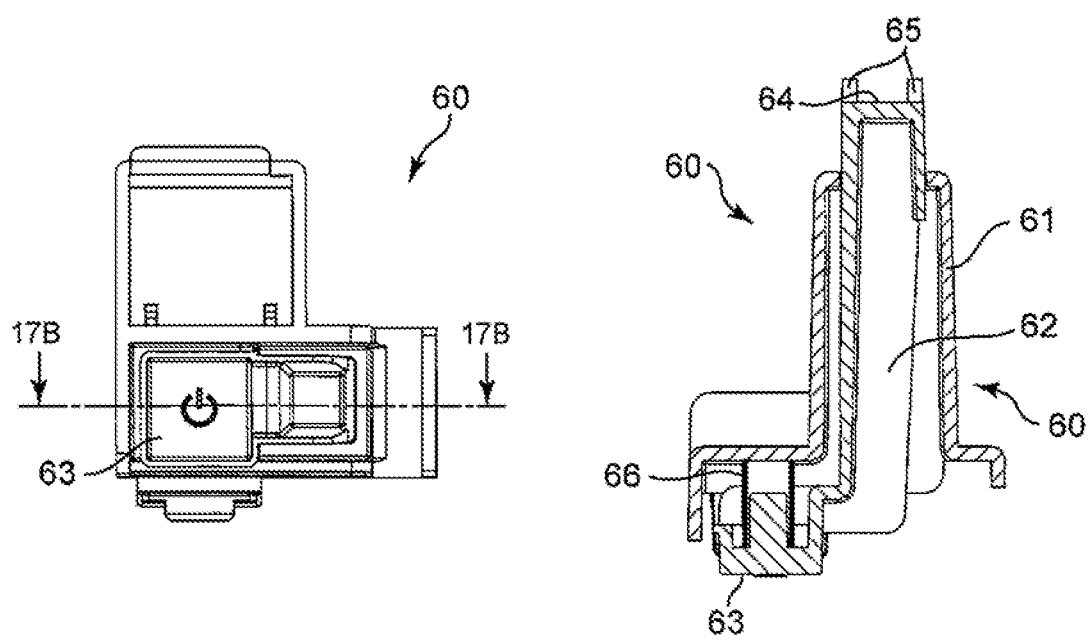
FIG. 17

FIG. 18A
FIG. 18B 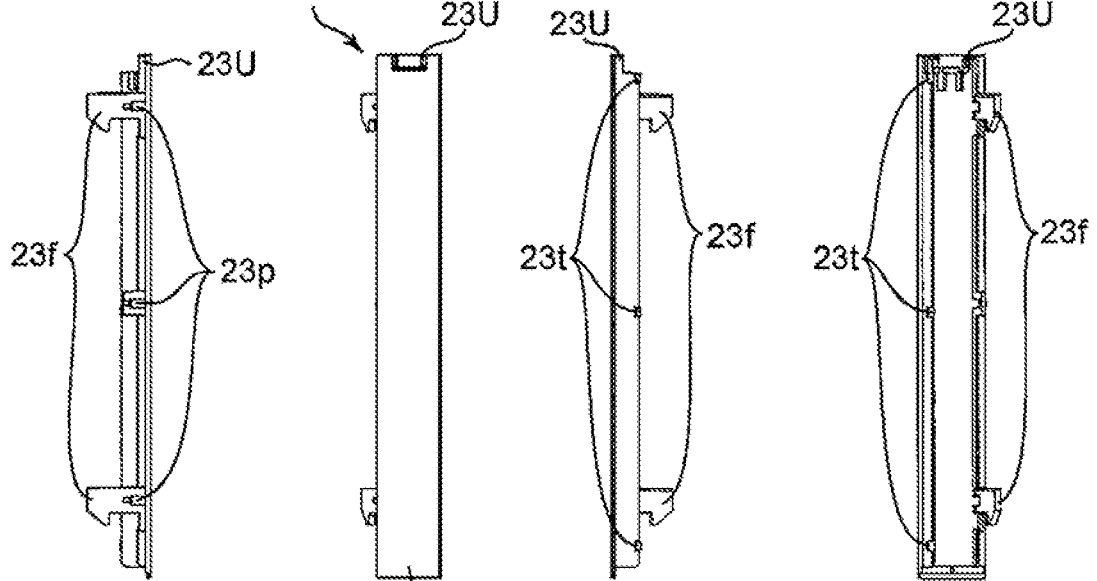 FIG. 18F
FIG. 18D  FIG. 18E
FIG. 18C
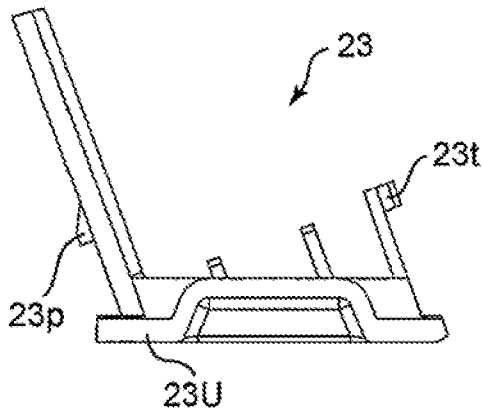 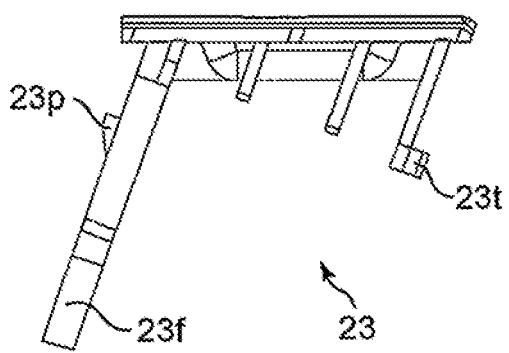
FIG. 19A  FIG. 19B

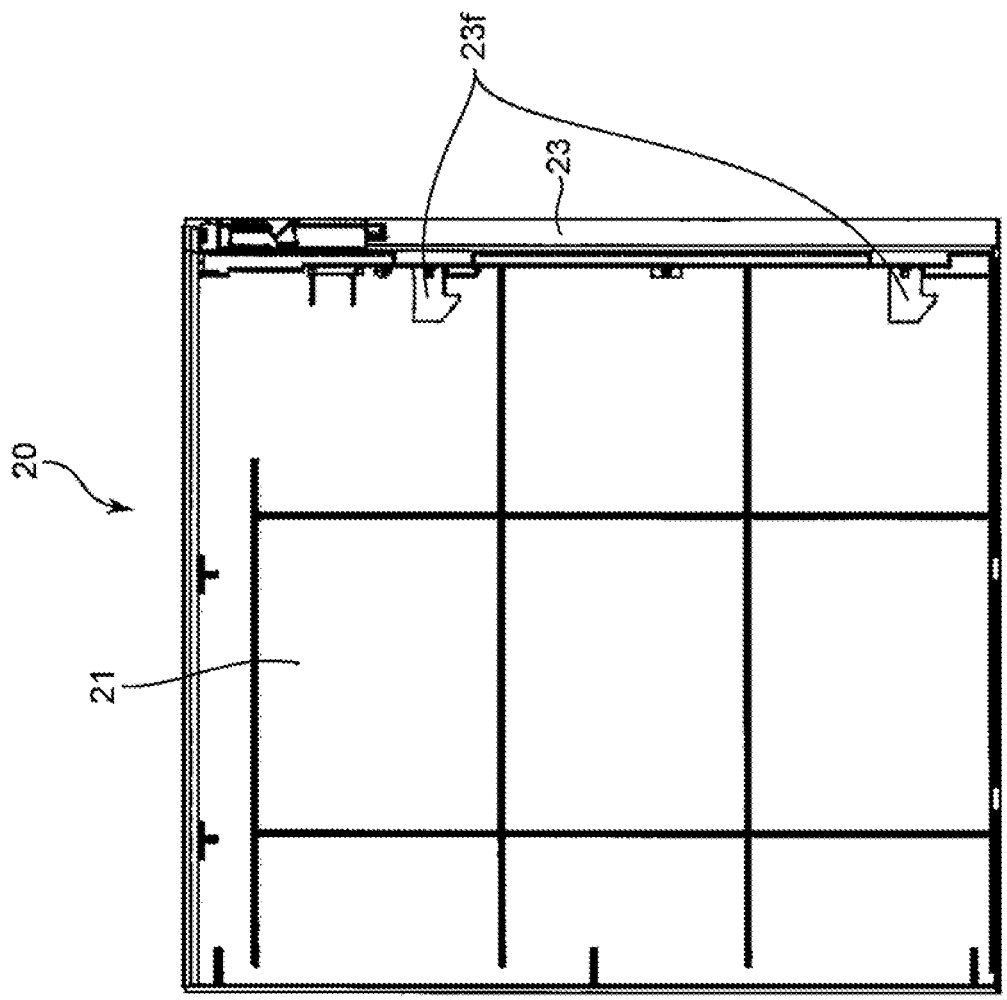
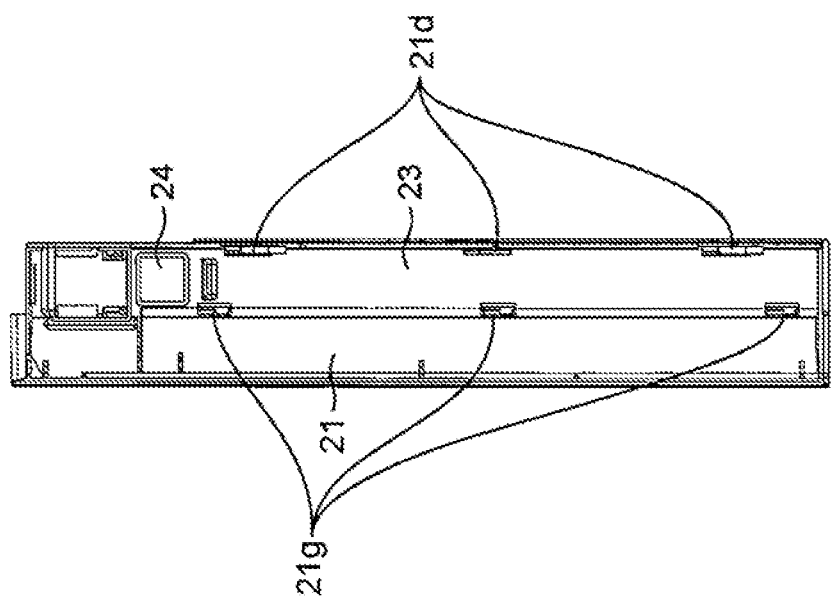
FIG. 21B
FIG. 21A

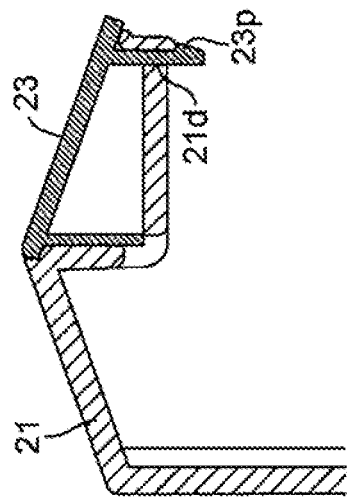
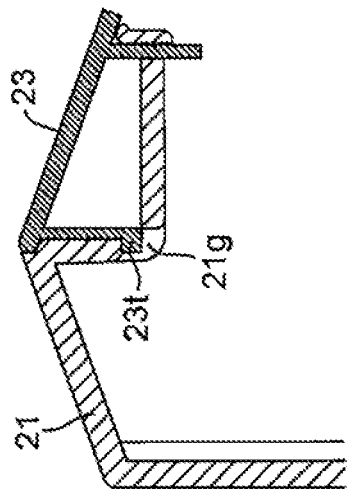
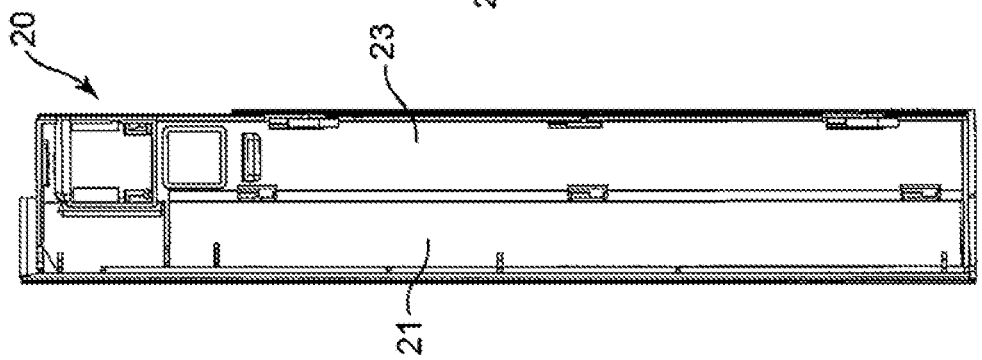

ELECTRONIC DEVICE, INFORMATION PROCESSING APPARATUS, AND POS TERMINAL

CROSS REFERENCE TO RELATED APPLICATIONS

This application is a National Stage of International Application No. PCT/JP2018/029223 filed Aug. 3, 2018, claiming priority based on Japanese Patent Application No. 2017-170909, filed Sep. 6, 2017, the disclosures of which are incorporated herein in their entirety by reference.

TECHNICAL FIELD

This invention relates to an electronic device, an information processing apparatus, and a POS terminal.

BACKGROUND ART

As an electronic device including an information processing apparatus such as a point-of-sales (POS) terminal, there is known a device of which a cover can be mounted or removed without any tool, for example, to thereby reduce man-hour required for maintenance.

In Patent Document 1, there is disclosed a POS terminal in which a rear cover mounted to a frame of a housing can be removed without any tool.

PRIOR ART DOCUMENT(S)

Patent Document(s)

Patent Document 1: JP 2013-097425 A

SUMMARY OF THE INVENTION

Problem to be Solved by the Invention

Regarding electronic devices having a cover which can be mounted or removed without any tool, which including the POS terminal disclosed in Patent Document 1, a maintenance person can easily remove the cover. On the other hand, anyone who has no permission to remove the cover can also easily remove the cover.

In the POS terminal disclosed in Patent Document 1, an operation knob for removing the rear cover is provided at a position that is difficult to find at a glance as described in paragraph [0058] of Patent Document 1. This structure can prevent a person who has no permission to remove the cover from tampering with the cover to some extent. However, it is a fact that the operation knob is exposed at a lower portion of the POS terminal. When the operation knob is exposed as described above, the risk of being tampered cannot be denied.

To address this, it is desired that the electronic device including the POS terminal disclosed in Patent Document 1 be configured so as to reduce the risk of being tampered.

This invention has an object to provide an electronic device capable of reducing a risk of being tampered.

This invention has another object to provide an information processing apparatus capable of reducing a risk of being tampered.

This invention has yet another object to provide a POS terminal capable of reducing a risk of being tampered.

Means to Solve the Problem

According to one aspect of this invention, there is provided an electronic device, comprising a device main body including a power switch; and a cover configured to cover at least a part of the device main body including the power switch, the cover including a cover main body removably mounted to the device main body by being slid in a width direction or a depth direction; a switch window, which is provided in the cover main body, and is configured to allow communication between the power switch and an outside of the cover so as to operate the power switch; a switch door, which is mounted to the cover main body to be openable upward, and is configured to cover the switch window; and a sliding member mounted adjacent to the switch door of the cover main body to be slidable from a first position as a lower position toward a second position as an upper position, in which the device main body has a projection protruding upward, in which the sliding member has a claw protruding downward, in which, when the switch door is closed, a lower end of the switch door is brought into contact with an upper end of the sliding member located at the first position, while, when the switch door is opened, the lower end is brought out of contact with the upper end of the sliding member, and in which, when the sliding member is at the first position, a side surface of the claw of the sliding member in the width direction or the depth direction is brought into contact with a side surface of the projection of the device main body in the width direction or the depth direction, while, when the sliding member is at the second position, the side surface of the claw is brought out of contact with the side surface of the projection of the device main body in the width direction or the depth direction.

According to another aspect of this invention, there is provided an information processing apparatus, comprising the electronic device, in which the device main body further includes a controller configured to perform information processing, in which the controller includes a calculator configured to perform arithmetic processing of information; a storage configured to store at least program software; and an information input/output unit configured to receive information that has not undergone the arithmetic processing as well as output information that has undergone the arithmetic processing, and in which the calculator is configured to perform the arithmetic processing based on the program software stored in the storage.

According to still another aspect of this invention, there is provided a POS terminal, comprising the information processing apparatus, the POS terminal further comprising a store-clerk display and a customer display.

According to another aspect of this invention, there is provided a method of removing a cover of the electronic device, the method comprising the steps of opening the switch door to bring the switch door out of contact with the upper end of the sliding member, to thereby allow the sliding member to slide to the second position; sliding the sliding member toward the second position to bring the side surface of the claw of the sliding member out of contact with the side surface of the projection of the device main body, to thereby allow the cover main body to slide in the width direction or the depth direction; and sliding the cover main body in the width direction or the depth direction to remove the cover main body from the device main body.

Effect of the Invention

The electronic device, the information processing apparatus, and the POS terminal according to this invention can reduce the risk of being tampered.

BRIEF DESCRIPTION OF THE DRAWING

FIG. 1 include FIG. 1A and FIG. 1B are perspective views for illustrating a POS terminal according to an embodiment of this invention, in which FIG. 1A is a perspective view as viewed from a front side, and FIG. 1B is a perspective view as viewed from a rear side.

FIG. 5A is a perspective view for illustrating the POS terminal from which the store-clerk display unit, the customer display unit, and the reader/writer holder are removed, as viewed from the rear side, and FIG. 5B is an enlarged perspective view for illustrating a switch door and its surroundings.

FIG. 9 is a top view for illustrating the POS terminal from which the store-clerk display unit, the customer display unit, and the reader/writer holder are removed.

FIG. 12A is a sectional view for illustrating the POS terminal illustrated in FIG. 11A, in which the sliding member is slid upward, as viewed from the direction indicated by the arrows, and FIG. 12B is an enlarged view for illustrating the switch door and its surroundings.

FIG. 14A is a top view for illustrating a door holding portion of the POS terminal according to the embodiment of this invention, FIG. 14B is a front view thereof, FIG. 14C is a bottom view thereof, FIG. 14D is a left side view thereof, FIG. 14E is a right side view thereof, and FIG. 14F is a rear view thereof.

FIG. 15A is a top view for illustrating the switch door of the POS terminal according to the embodiment of this invention, FIG. 15B is a front view thereof, FIG. 15C is a bottom view thereof, FIG. 15D is a left side view thereof, FIG. 15E is a right side view thereof, and FIG. 15F is a rear view thereof.

FIG. 16A is a top view for illustrating a switch extension of the POS terminal according to the embodiment of this invention, FIG. 16B is a front view thereof, FIG. 16C is a bottom view thereof, FIG. 16D is a left side view thereof, FIG. 16E is a right side view thereof, and FIG. 16F is a rear view thereof.

FIG. 17A is a front view for illustrating the switch extension illustrated in FIGS. 16A to 16F, and FIG. 17B is a sectional view taken along the line 17B-17B of FIG. 16A.

FIG. 18A is a top view for illustrating the sliding member of the POS terminal according to the embodiment of this invention, FIG. 18B is a front view thereof, FIG. 18C is a bottom view thereof, FIG. 18D is a left side view thereof, part (c) being FIG. 18E is a right side view thereof, and FIG. 18F is a rear view thereof.

FIG. 19A is a top view for illustrating the sliding member illustrated in FIGS. 18A to 18F, and FIG. 19B is a bottom view thereof.

FIG. 21A is a view for illustrating the inside of the cover main body of the POS terminal according to the embodiment of this invention, to which the sliding member is mounted, and FIG. 21B is another view for illustrating the inside.

FIG. 22A is a view for illustrating the inside of the cover main body of the POS terminal according to the embodiment of this invention, to which the sliding member is mounted, FIG. 22B is an enlarged view for illustrating a central portion in a vertical direction, FIG. 22C is an enlarged sectional view taken along the line 22C-22C of FIG. 22B, and FIG. 22D is an enlarged sectional view taken along the line 22D-22D of FIG. 22B.

MODE(S) FOR EMBODYING THE INVENTION

Figure 1B:
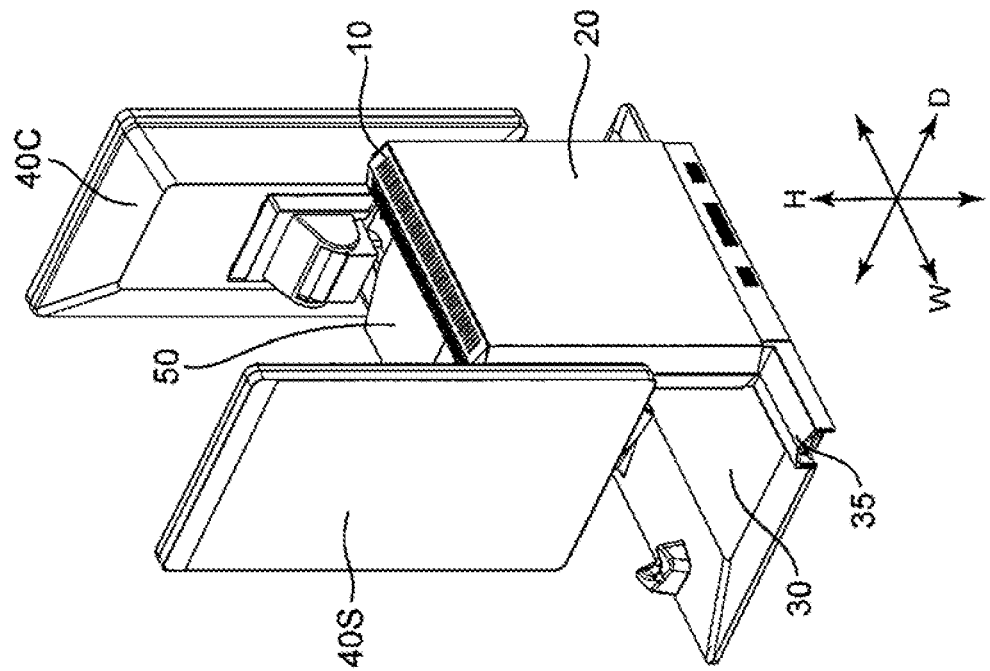

With reference to the drawings, a POS terminal as an electronic device (information processing apparatus) according to an embodiment of this invention is described below. In the drawings, a width direction, a height direction, and a depth direction are denoted by reference symbols W, H, and D, respectively.

With reference to FIG. 1A to FIG. 23B, the POS terminal as the electronic device (information processing apparatus) according to the embodiment of this invention includes a device main body 10 and a cover 20. The device main body 10 includes a control box 11 having a controller incorporated therein, and a power switch 12 (illustrated in FIG. 3, for example). The cover 20 is configured to cover at least a part of the device main body 10 including the power switch 12.

Although not illustrated, the controller incorporated in the control box 11 includes a calculator configured to perform arithmetic processing of information, a storage configured to store at least program software, and an information input/output unit configured to receive information that has not undergone arithmetic processing as well as to output information that has undergone arithmetic processing. The calculator is configured to perform arithmetic processing based on the program software stored in the storage.

The information processing apparatus of this invention further includes a store-clerk display 40S and a customer display 40C.

The POS terminal of this invention further includes a support base 30. The support base 30 includes a cable lead-out portion 35 from which to lead out a cable for electrical connection between the device main body 10 and another electronic device (not shown).

The cover 20 includes a cover main body 21, a switch window 24 (illustrated in FIG. 6B, for example), a switch door 22, and a sliding member 23. The cover main body 21 is removably mounted to the device main body 10 by being slid in the width direction W or the depth direction D (in this example, width direction W). The switch window 24 is provided in the cover main body 21 and configured to allow communication between the power switch 12 and the outside of the cover 20 so as to operate the power switch 12. The switch door 22 is mounted to the cover main body 21 to be openable upward, and configured to cover the switch window 24. The sliding member 23 is mounted adjacent to the switch door 22 of the cover main body 21 to be slidable from a first position as a lower position toward a second position as an upper position.

The switch door 22 illustrated in FIGS. 15A to 15F is mounted to the cover main body 21 to be openable obliquely upward about a rotation axis extending in the depth direction D or the width direction W (in this example, depth direction D).

The sliding member 23 illustrated in FIGS. 18A to 18F, and FIGS. 19A and 19B is mounted below the switch door 22 of the cover main body 21 to be slidable from the first position as the lower position to the second position as the upper position. As apparent from FIG. 5A, for example, the sliding member 23 mounted to the cover main body 21 is designed to be continuous to the cover main body 21, in other words, be common or integral with the cover main body 21. Thus, when the sliding member 23 is at the first position as the lower position, it is difficult to find the sliding member 23 slidable.

The device main body 10 has projections 10p (illustrated in FIGS. 8A and 8B, for example) which protrude upward.

The sliding member 23 has claws 23f (illustrated in FIG. 13, for example) which protrude downward.

The switch door 22 is urged to close by its own weight. Meanwhile, the sliding member 23 is urged to stay at the first position by its own weight.

The cover 20 further includes a switch extension 60 (illustrated in FIG. 6A, for example) mounted to the cover main body 21 to extend between the switch window 24 and the power switch 12, and to be displaceable in an operation direction of the power switch 12. The switch extension 60 illustrated in FIGS. 16A to 16F and FIGS. 17A and 17B allows the power switch 12 to be operated from the outside of the cover 20.

Here, as illustrated in FIGS. 5A and 5B to FIGS. 7A and 7B, and FIGS. 10A and 10B to FIGS. 12A and 12B, when the switch door 22 is closed, a lower end 22L of the switch door 22 is brought into contact with an upper end 23U of the sliding member 23 at the first position. Meanwhile, when the switch door 22 is opened, the lower end 22L is brought out of contact with the upper end 23U of the sliding member 23.

As illustrated in FIGS. 5A and 5B to part FIGS. 7A and 7B, and FIGS. 10A and 10B to FIGS. 12A and 12B, when the sliding member 23 is at the first position, a side surface 23fs of each claw 23f of the sliding member 23 in the width direction W or the depth direction D (in this example, width direction W) is brought into contact with a side surface 10ps of a corresponding projection 10p of the device main body 10 in the width direction W or the depth direction D (in this example, width direction W). Meanwhile, when the sliding member 23 is at the second position, the side surface 23fs is brought out of contact with the side surface 10ps of the corresponding projection 10p of the device main body 10.

Figure 23B:
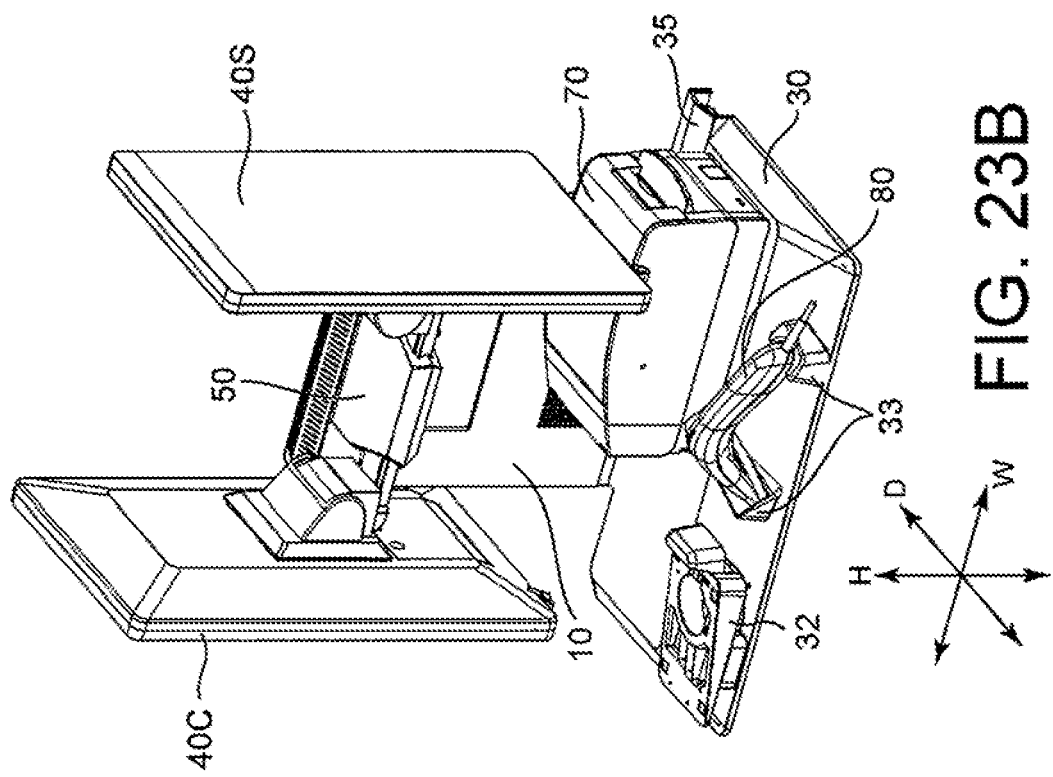
FIGS. 23A and 23B are perspective views for illustrating the POS terminal according to the embodiment of this invention, to which a receipt printer and a barcode reader are mounted.
Figure 23A:
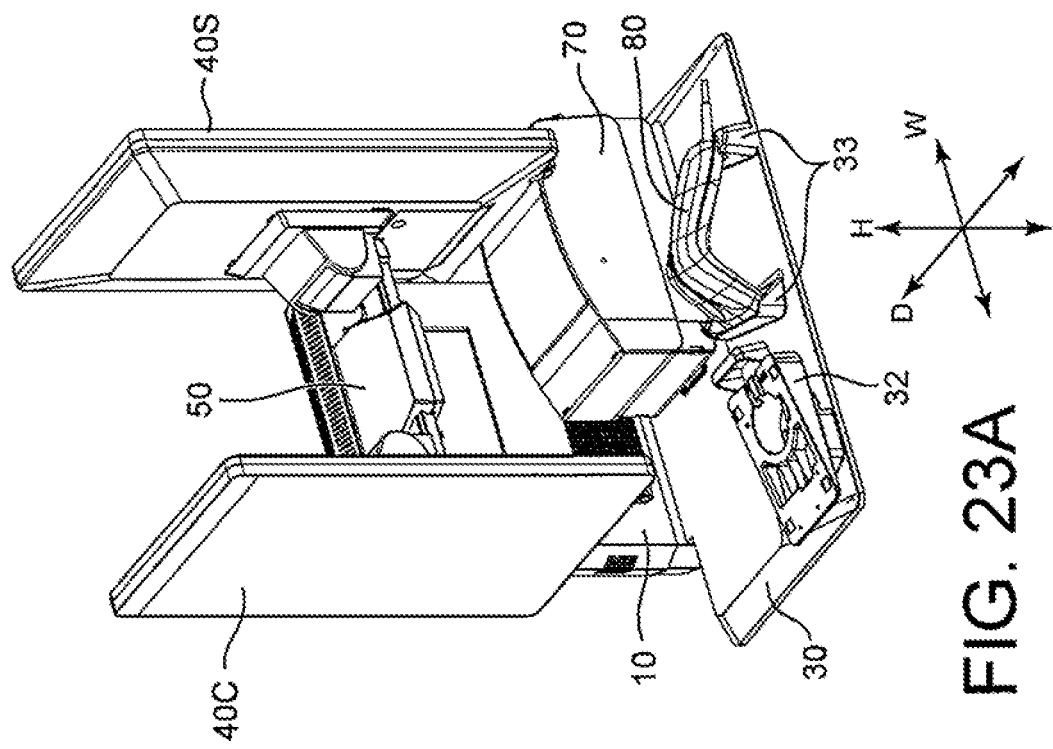

As illustrated in FIGS. 23A and 23B, the POS terminal of this invention further includes a receipt printer 70 and a barcode reader 80 as peripheral devices.

Next, the POS terminal of this invention is described in more detail with reference to the drawings.

With reference to FIGS. 1A and 1B, FIG. 2, FIG. 3, and FIG. 4, the POS terminal as the electronic device (information processing apparatus) according to the embodiment of this invention includes the device main body 10 including the control box 11 having the controller incorporated therein, the store-clerk display unit 40S, the customer display unit 40C, and the support base 30 on which to mount an auxiliary device.

The store-clerk display unit 40S and the customer display unit 40C both include a touch panel display, and are supported by a display support portion 50 provided above the device main body 10, so as to be adjustable in angle. Although not illustrated, a connection cable for the auxiliary device is led out of the cable lead-out portion 35 of the support base 30. On the support base 30, a reader/writer holder 32 and a barcode reader placement portion 33 are provided.

Figure 1A:
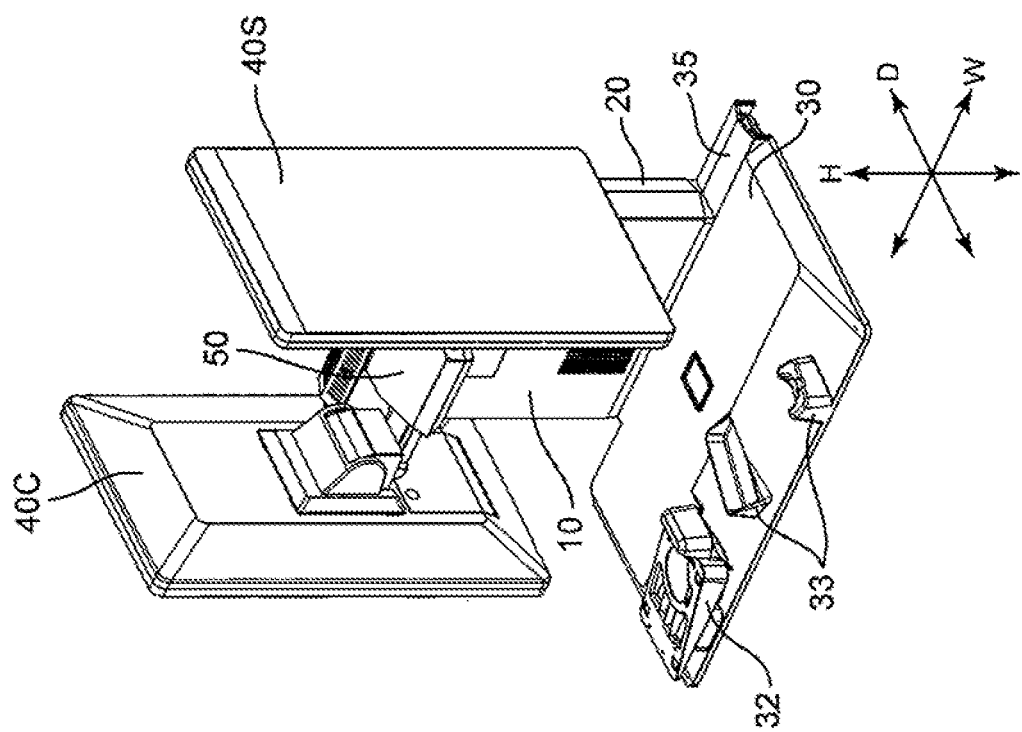
Figure 2:
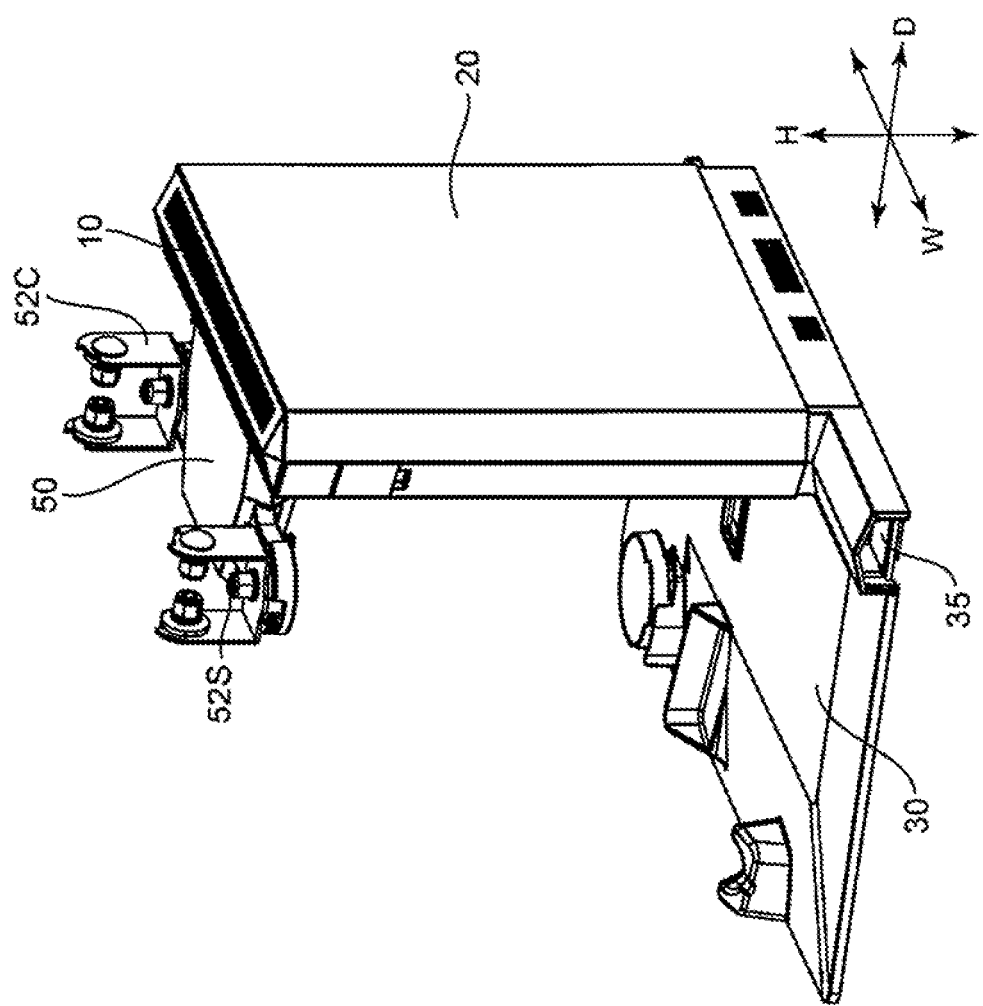
FIG. 2 is a perspective view for illustrating the POS terminal from which a store-clerk display unit, a customer display unit, and a reader/writer holder are removed, as viewed from the rear side.
Figure 3:
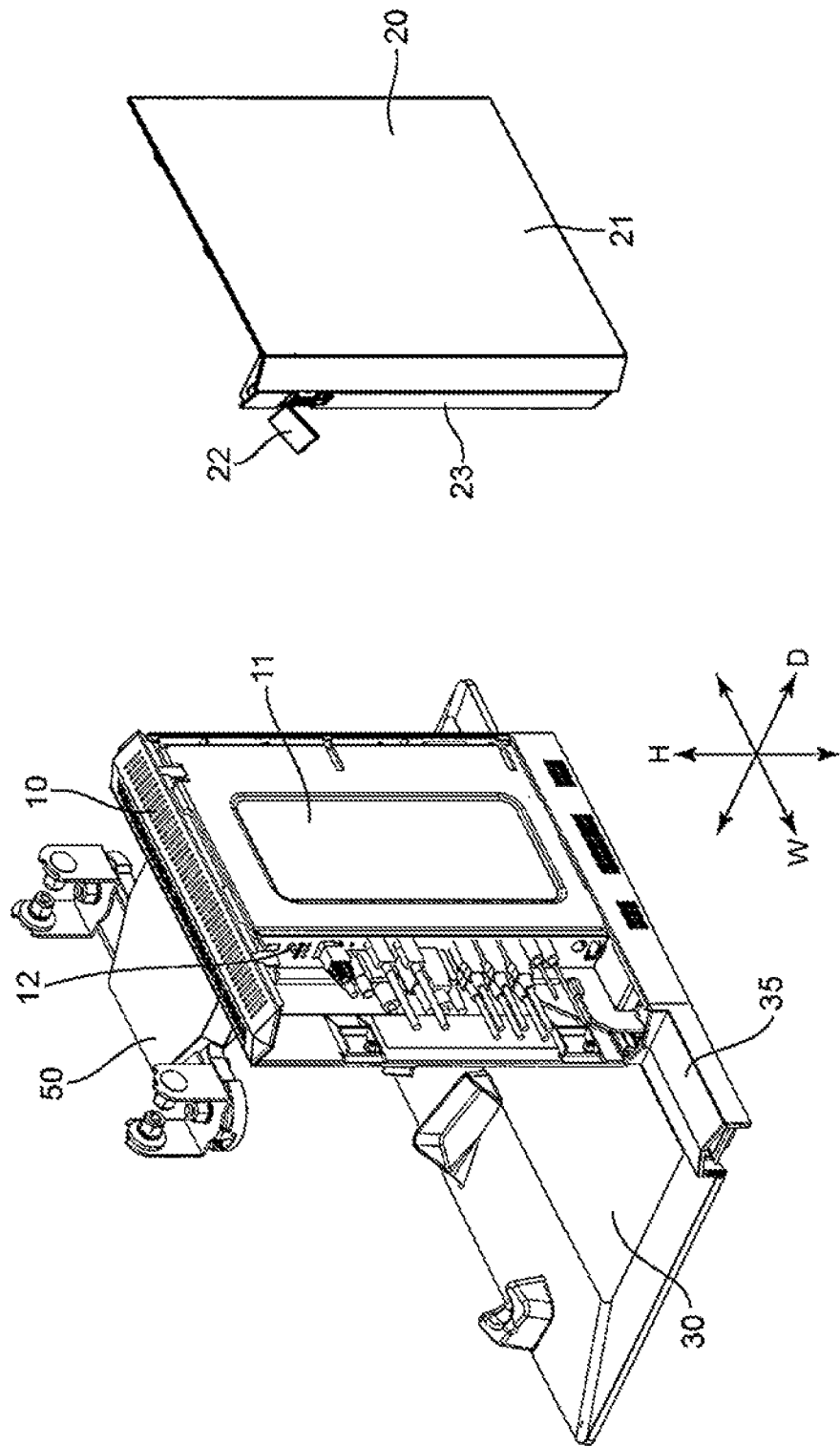
FIG. 3 is a perspective view for illustrating the POS terminal illustrated in FIG. 2, from which a cover is removed, and the removed cover.

FIG. 2 is a view for illustrating the terminal of FIGS. 1A and 1B, from which the store-clerk display unit 40S, the customer display unit 40C, and the reader/writer holder 32 are removed. In FIG. 2, a hinge portion 52S for the store-clerk display unit 40S and a hinge portion 52C for the customer display unit 40C remain mounted. FIG. 3 is a view for illustrating the terminal of FIG. 2, from which the cover 20 is removed. Further, in FIG. 3, illustration of each connection cable that is installed in the control box 11 having the controller incorporated therein, ends in the middle thereof. As illustrated in FIG. 3, the control box 11 includes the power switch 12.

Figure 4:
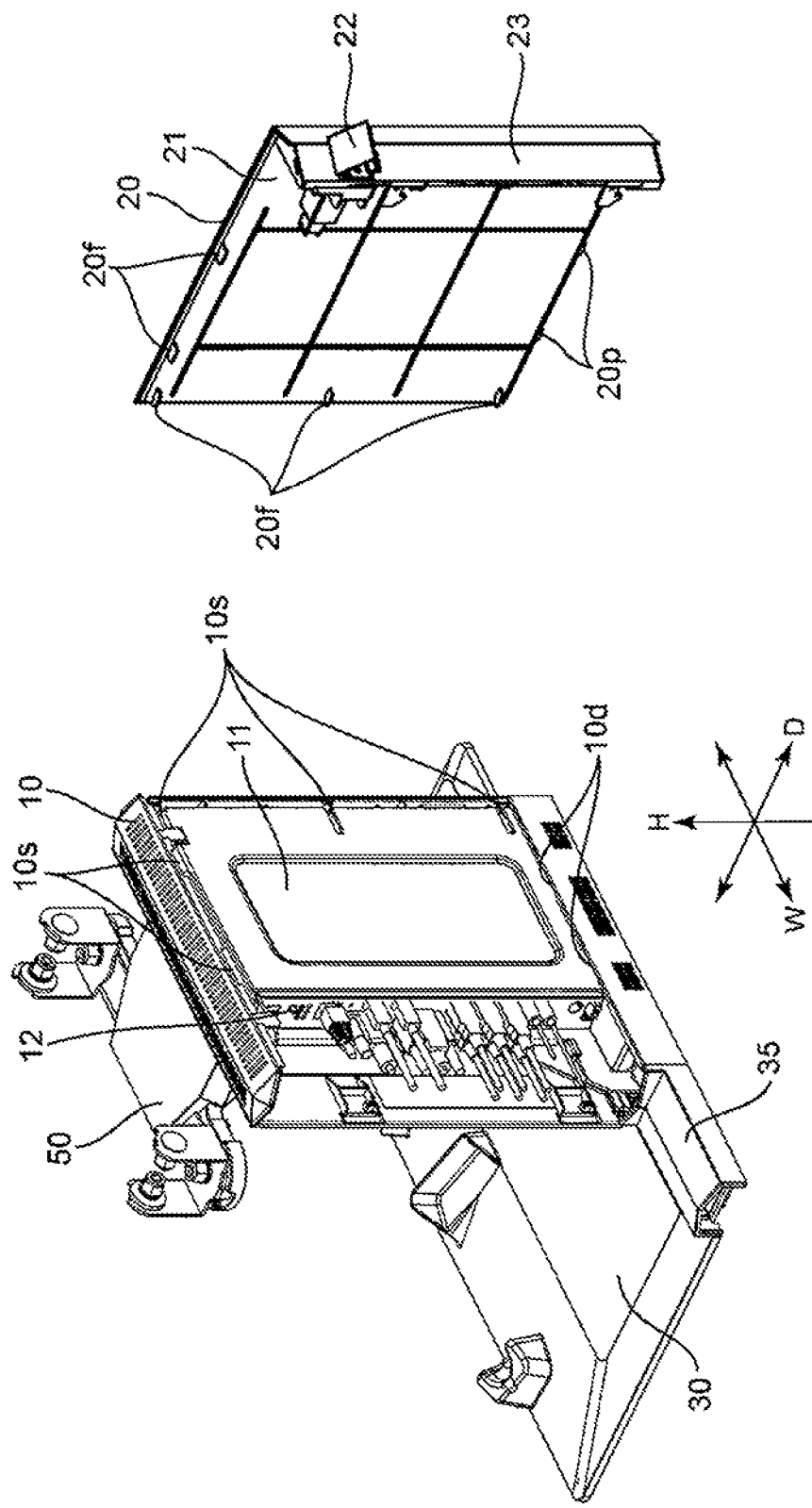
FIG. 4 is a perspective view for illustrating the POS terminal illustrated in FIG. 2, from which the cover is removed, and the inside of the removed cover.
Figure 6B:
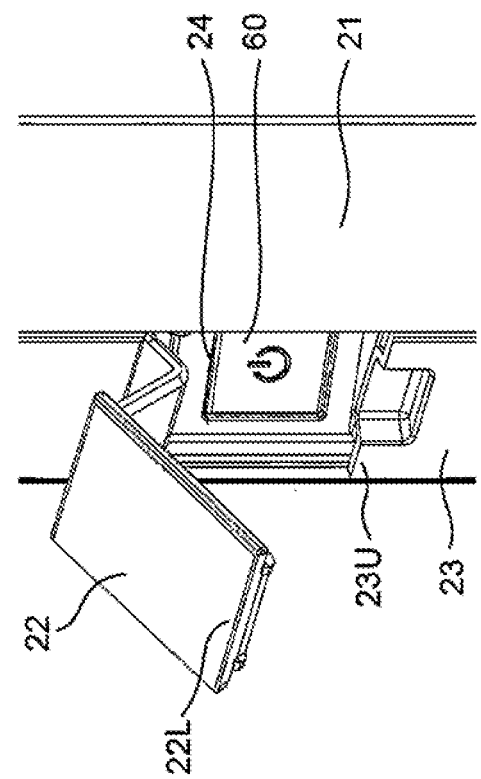
FIG. 6B is an enlarged perspective view for illustrating the switch door and its surroundings.
Figure 6A:
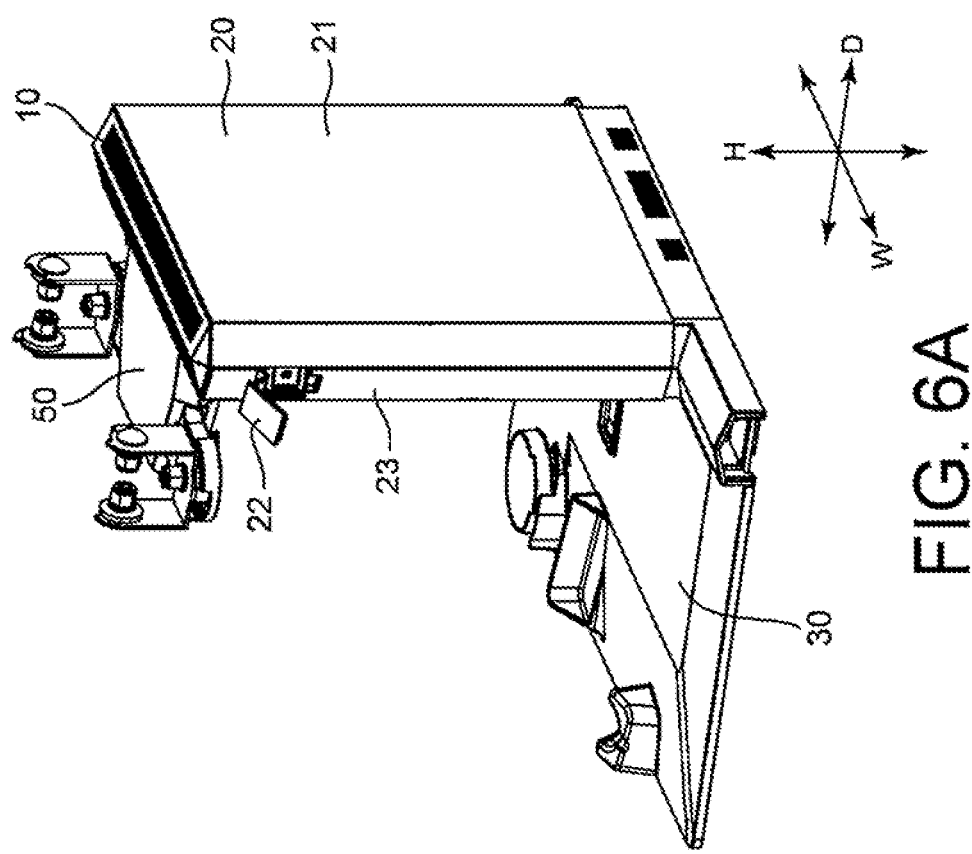
FIG. 6A is a perspective view for illustrating the POS terminal illustrated in FIGS. 5A and 5B, in which the switch door is opened.
Figure 7B:
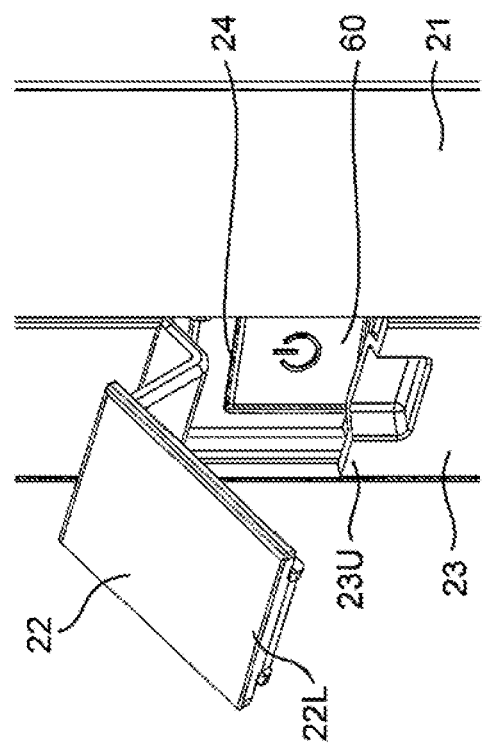
FIG. 7B is an enlarged perspective view for illustrating the switch door and its surroundings.
Figure 7A:
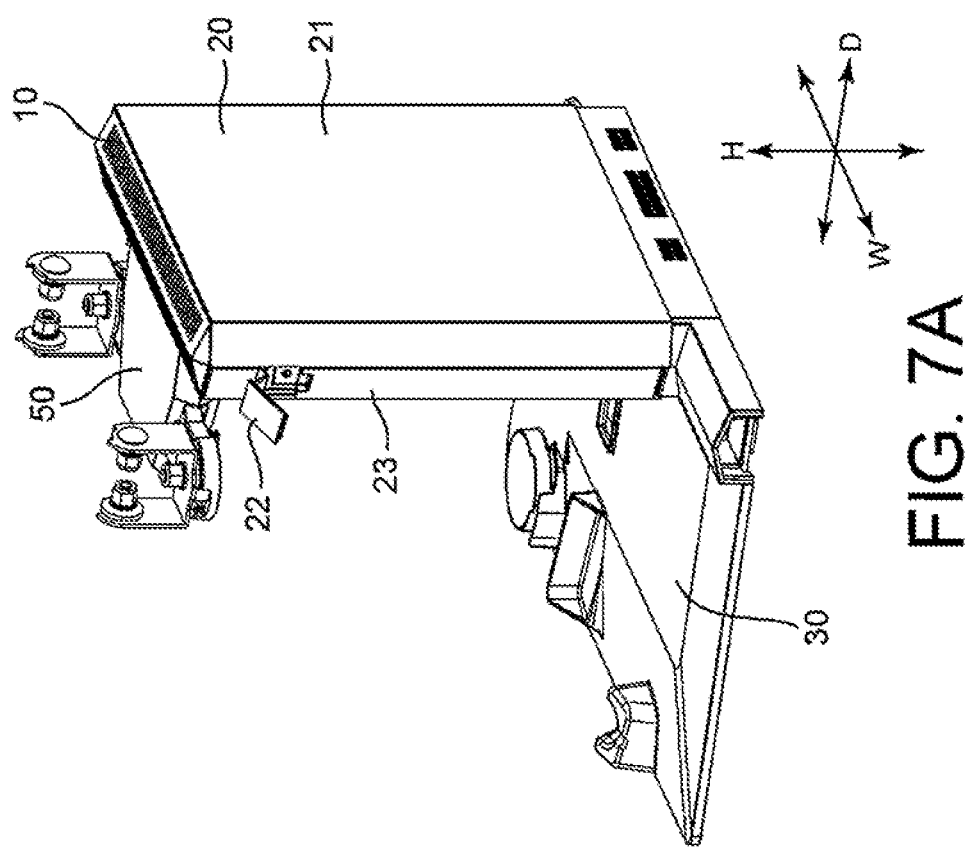
FIG. 7A is a perspective view for illustrating the POS terminal illustrated in FIGS. 6A and 6B, in which a sliding member is slid upward.
Figure 8B:
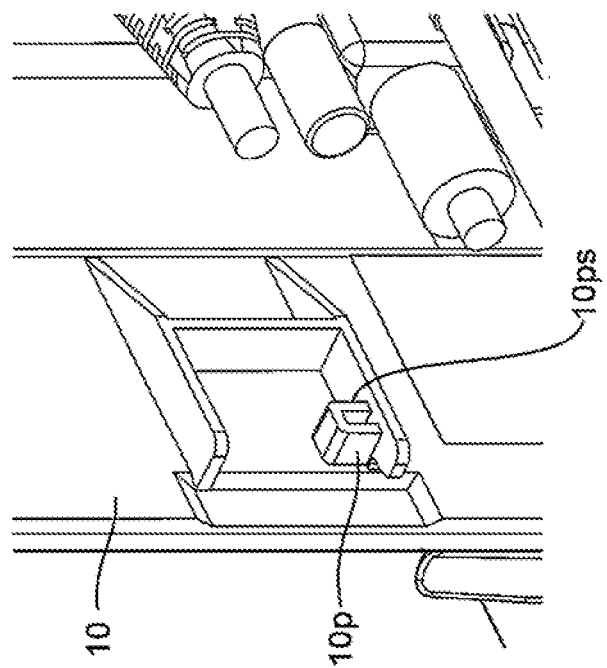
FIG. 8B is an enlarged perspective view for illustrating a projection of a device main body and its surroundings.
Figure 8A:
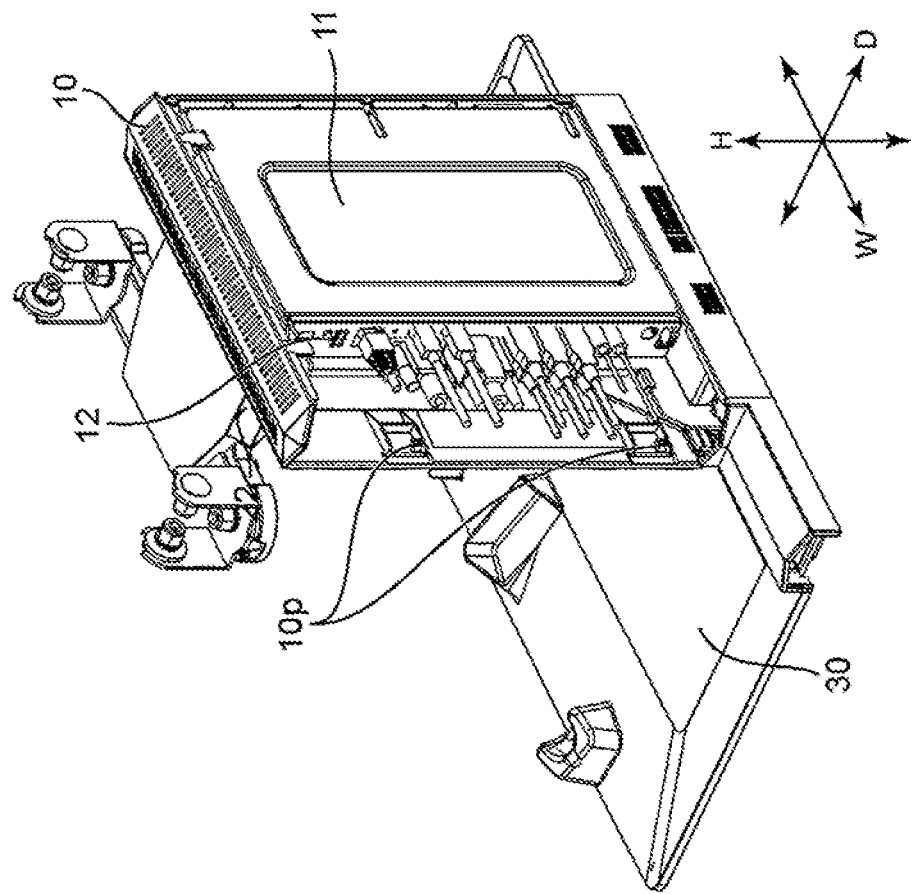
FIG. 8A is a perspective view for illustrating the POS terminal from which the store-clerk display unit, the customer display unit, the reader/writer holder, and the cover are removed, as viewed from the rear side.
Figure 10A:
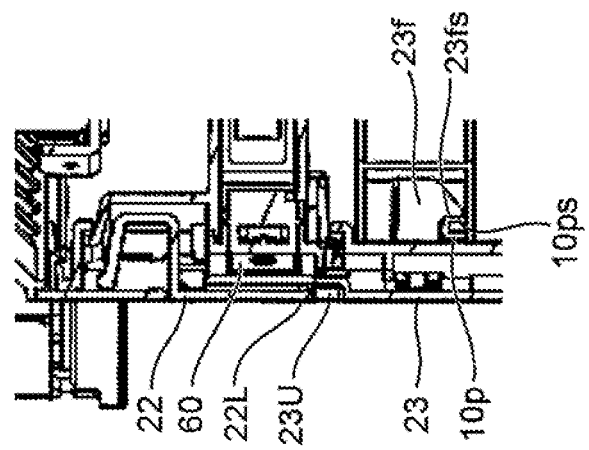
FIG. 10A is a sectional view for illustrating the POS terminal taken along the line 10A-10A of FIG. 9 as viewed from the direction indicated by the arrows.
Figure 10B:
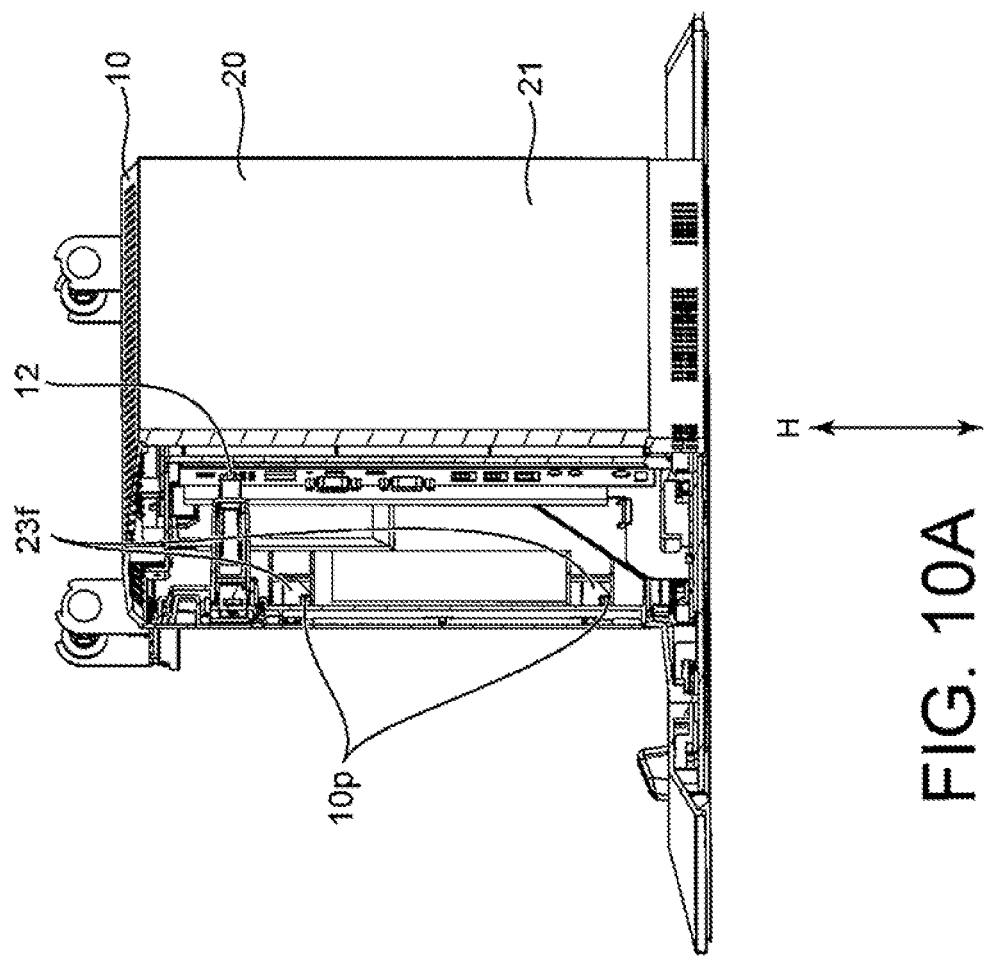
FIG. 10B is an enlarged view for illustrating the switch door and its surroundings.
Figure 11B:
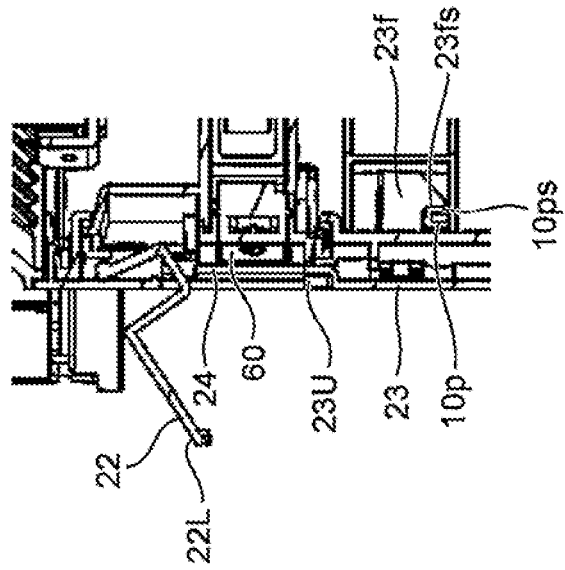
FIG. 11B is an enlarged view for illustrating the switch door and its surroundings.
Figure 11A:
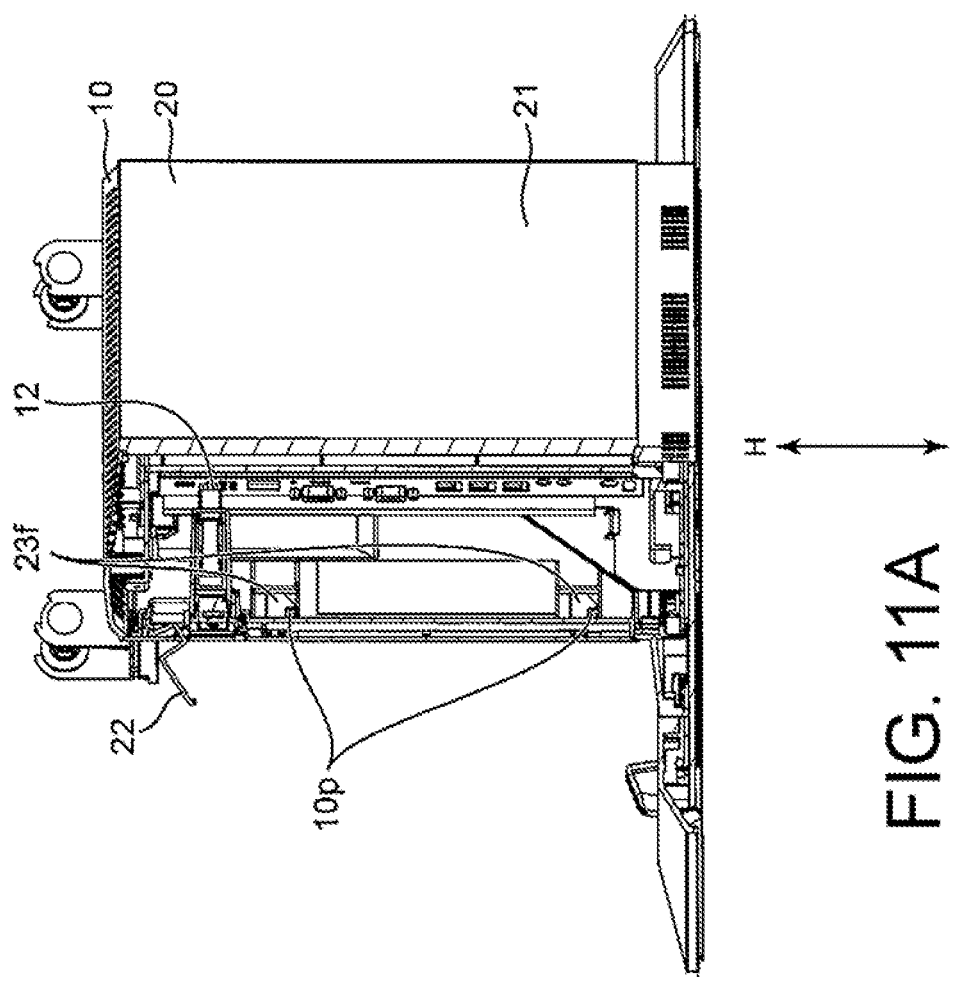
FIG. 11A is a sectional view for illustrating the POS terminal illustrated in FIG. 10A, in which the switch door is opened, as viewed from the direction indicated by the arrows.

As seen from FIG. 4, when the cover 20 is mounted to the POS terminal, L-shaped engagement claws 20f (provided at five positions) of the cover 20 are fitted into recesses 10s provided at five positions of the device main body 10. Further, protrusions 20p provided at two positions of a lower end of the cover 20 are inserted into recesses 10d provided at two positions of the device main body 10.

Next, a method of removing the cover 20 is described with reference to FIGS. 5A and 5B to FIGS. 12A and 12B.

The switch door 22 is normally closed as illustrated in FIGS. 5A and 5B and FIGS. 10A and 10B. At this time, with the switch door 22 being closed, the sliding member 23 cannot be pushed upward. Thus, the side surface 23fs of each claw 23f of the sliding member 23 is brought into contact with the side surface 10ps of a corresponding projection 10p of the device main body 10.

Next, as illustrated in FIGS. 6A and 6B and FIGS. 11A and 11B, the switch door 22 is flipped open. At this time, the switch extension 60 is exposed in the switch window 24. Further, with the switch door 22 being opened, the sliding member 23 can be pushed upward.

Further, as illustrated in FIGS. 7A and 7B and FIGS. 12A and 12B, when the sliding member 23 is pushed upward with a finger put on a lower end 23L (FIG. 18B) of the sliding member 23 under a state in which the switch door 22 is kept open, the side surface 23fs of each claw 23f of the sliding member 23 is brought out of contact with the side surface 10ps of the corresponding projection 10p of the device main body 10.

Further, when the cover 20 is slid in the width direction W (in this example, rightward as viewed from the front side) under a state illustrated in FIGS. 7A and 7B and FIGS. 12A and 12B, the engagement claws 20f (see FIG. 4) of the cover 20, which have been inserted into the recesses 10s (see FIG. 4) of the device main body 10, are removed therefrom, so that the cover 20 can be removed.

In this way, the cover 20 is removed from the device main body 10.

Next, the structure of the cover 20 is described with reference to FIG. 13 to FIG. 20.

Figure 13:
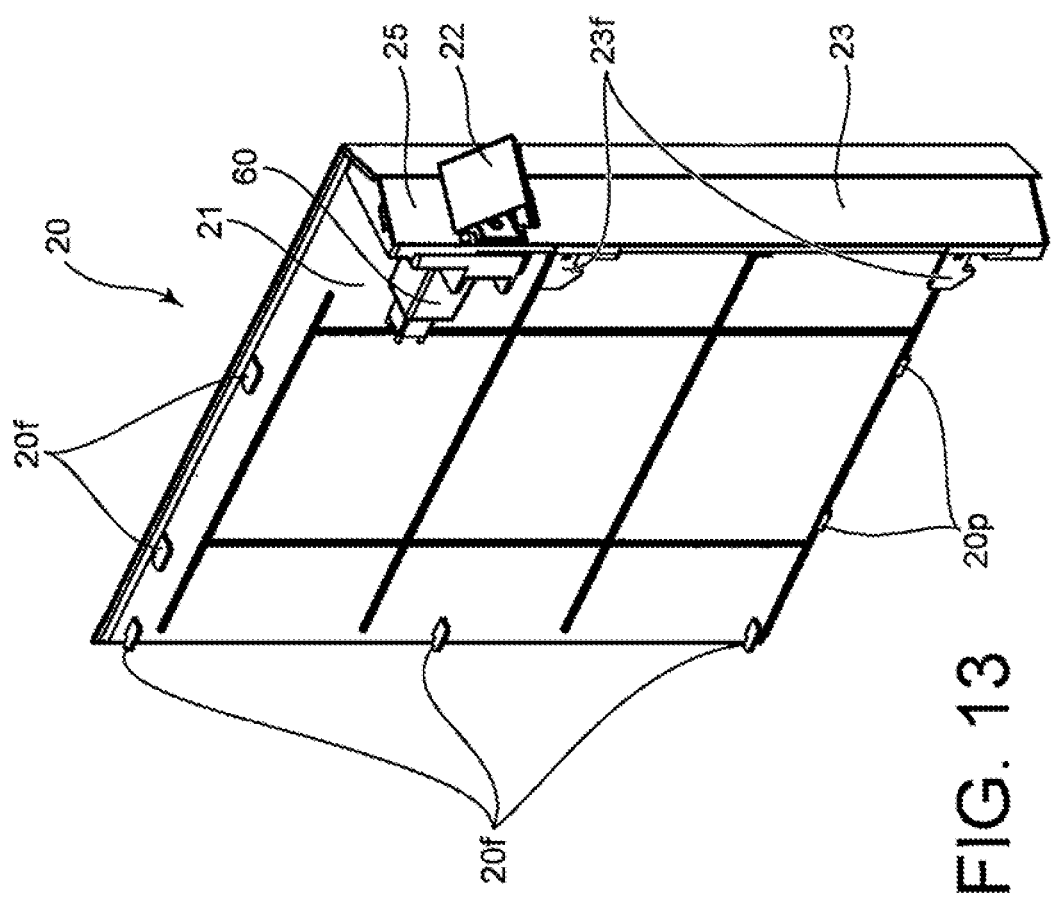
FIG. 13 is a perspective view for illustrating the inside of the cover of the POS terminal according to the embodiment of this invention.
Figure 20:
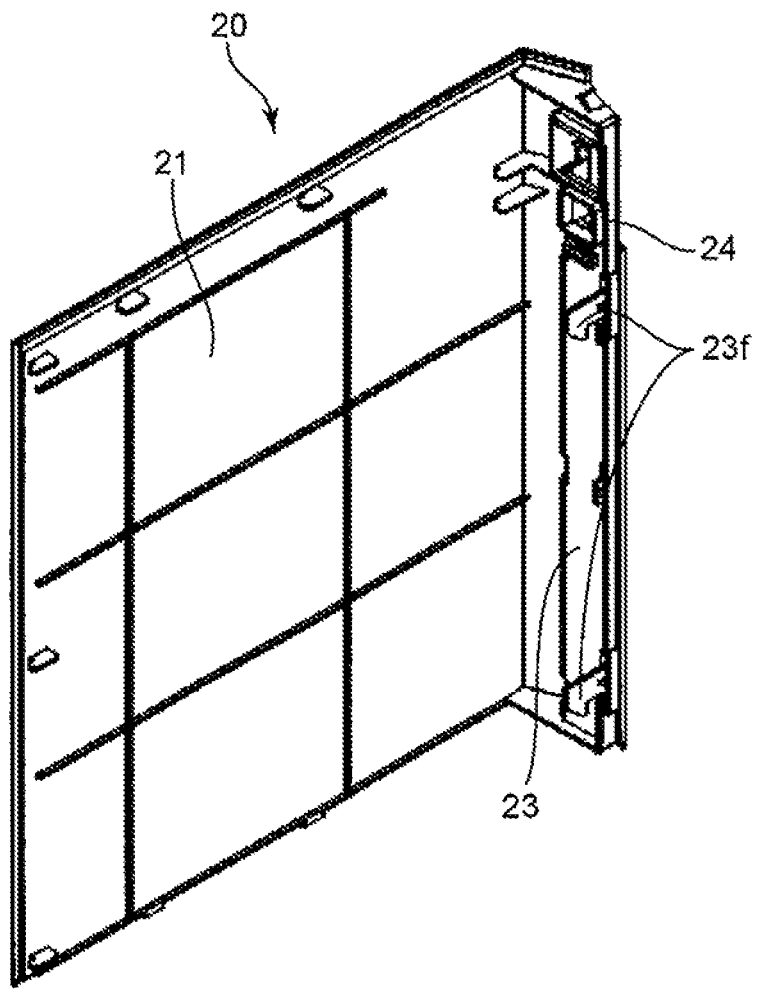
FIG. 20 is a perspective view for illustrating the inside of a cover main body of the POS terminal according to the embodiment of this invention, to which the sliding member is mounted.

As illustrated in FIG. 13, the cover 20 includes the cover main body 21, a door holding portion 25, the switch door 22, the switch extension 60, and the sliding member 23. As described above with reference to FIG. 4, the cover main body 21 has the engagement claws 20f at five positions, and has the protrusions 20p at two positions of the lower end.

The door holding portion 25 illustrated in FIGS. 14A to 14F is assembled to the cover main body 21. The door holding portion 25 has, at two positions, holes 25x in which to insert a pivot shaft of the switch door 22 as described later.

The switch door 22 illustrated in FIGS. 15A to 15F is pivotably held by the door holding portion 25 assembled to the cover main body 21. A pivot shaft 22x of the switch door 22 is inserted into the holes 25x of the door holding portion 25. The switch door 22 is pivotally openable about the pivot shaft 22x.

As illustrated in FIGS. 16A to 16F and FIGS. 17A and 17B, the switch extension 60 is assembled to the cover main body 21. The switch extension 60 includes a holding portion 61, a movable portion 62, and a compression coil spring 66. The movable portion 62 is formed into an L shape by which the power switch 12 (FIG. 3 and FIG. 4) of the control box 11 can be depressed from the switch window 24 FIG. 6B and FIG. 11B) of the cover main body 21. A center line of an operation surface 63 marked with a symbol indicating the power switch 12 does not match a center line of the power switch 12. When a store-clerk or other person presses the operation surface 63, the movable portion 62 is moved to bring a contact surface 64 into contact with the power switch 12 of the control box 11, to thereby depress the power switch 12. The contact surface 64 has stoppers 65 provided at four positions to prevent the power switch 12 from being excessively pressed.

As illustrated in FIGS. 18A to 18F and FIGS. 19A and 19B, the sliding member 23 has the hook-like claws 23f protruding downward at two positions. The sliding member 23 also has projections 23p to be inserted into corresponding holes of the cover main body 21. The projections 23p are provided at three positions on the claw 23f side of the sliding member 23. Of those projections, two projections overlap the claws 23f At three positions on the opposite side to the claw 23f side of the sliding member 23, projections 23t to be inserted into corresponding holes of the cover main body 21 are provided.

With further reference to FIG. 20, FIGS. 21A and 21B, and FIGS. 22A to 22D, the sliding member 23 has the projections 23p at three positions, and the projections 23t at three positions as described above. Meanwhile, the cover main body 21 has holes 21d and holes 21g corresponding to the projections 23p and the projections 23t of the sliding member 23, respectively. Through insertion of the projections 23p and the projections 23t of the sliding member 23 into the holes 21d and the holes 21g of the cover main body 21, respectively, the sliding member 23 is assembled to the cover main body 21. As seen from FIG. 22C, and FIG. 22D, the projections 23p and the projections 23t of the sliding member 23 inserted into the holes 21d and the holes 21g of the cover main body 21, respectively, have hook-like end portions that prevent the sliding member 23 from being removed from the cover main body 21. The sliding member 23 is movable only by a distance corresponding to a dimensional difference between the holes 21d of the cover main body 21 and the inserted projections 23p of the sliding member 23 and that between the holes 21g of the cover main body 21 and the inserted projections 23t of the sliding member 23.

With reference to FIGS. 23A and 23B, the POS terminal of this invention includes the receipt printer 70 and the barcode reader 80 as auxiliary devices at positions close to the store-clerk display unit 40S side on the support base 30. Further, the reader/writer holder 32 is provided at a position close to the customer display unit 40C side on the support base 30, and a reader/writer (not shown) serving as an auxiliary device is mounted thereon as required. In part FIGS. 23A and 23B, connection cables for connection between the auxiliary devices and the device main body 10 are not illustrated.

In the embodiment described above, the switch extension 60 is assembled to the cover 20, but may be also assembled to the control box in place of the cover. Further, the switch extension may be incorporated in the control box instead of being added to the outside of the control box. Further, the control box may not have the switch extension, and the power switch may be provided at a position that allows the power switch itself to be depressed through the switch window.

As apparent from the description above, according to the electronic device of this invention, the cover can be easily removed without any tool and in addition, the operation knob for removing the cover is not even provided, much less exposed to the outside of the electronic device. Further, when the cover is to be removed, it is required to perform operations of opening the switch door and then keeping the sliding member pushed upward, and under this state, sliding the cover, that is, a plurality of different kinds of operations. This structure reduces the risk of the electronic device being tampered by a customer or other person who has no permission to operate the electronic device.

Further, the switch door is not only a member that covers the power switch to be protected against tampering by a person who has no permission to operate the electronic device, but also is a kind of lock member that requires a certain operation to remove the cover. With this structure, cost reduction can be achieved compared to the structure in which the member for covering the power switch and the lock member for the cover are separately provided.

Further, the sliding member is not only a kind of lock member that requires a certain operation to remove the cover as with the switch door, but also functions as an outer cover member for covering the device main body together with the cover main body. With this structure, cost reduction can be achieved compared to the structure in which the outer cover member and the lock member for the cover are separately provided. In addition, it is conceivable that a person who has no permission to operate the electronic device be less likely to find the sliding member to be a lock member when he/she sees the sliding member.

REFERENCE SIGNS LIST 10 device main body
10p projection
10ps side surface 11 control box
12 power switch
20 cover
21 cover main body
22 switch door
22L lower end
23 sliding member
23f claw
23fs side surface
23L lower end
23U upper end
24 switch window
30 support base
32 reader/writer holder
33 barcode reader placement portion
35 cable lead-out portion
40C customer display
40S store-clerk display
50 display support portion
52C hinge portion
52S hinge portion
60 switch extension
70 receipt printer
80 barcode reader

The invention claimed is:

1. An electronic device, comprising:
a device main body including a power switch; and
a cover configured to cover at least a part of the device main body including the power switch,
the cover including:
a cover main body removably mounted to the device main body by being slid in a width direction or a depth direction;
a switch window, which is provided in the cover main body, and is configured to allow communication between the power switch and an outside of the cover so as to operate the power switch;
a switch door, which is mounted to the cover main body to be openable upward, and is configured to cover the switch window; and
a sliding member mounted adjacent to the switch door of the cover main body to be slidable from a first position as a lower position toward a second position as an upper position,
wherein the device main body has a projection protruding upward,
wherein the sliding member has a claw protruding downward,
wherein, when the switch door is closed, a lower end of the switch door is brought into contact with an upper end of the sliding member located at the first position, while, when the switch door is opened, the lower end is brought out of contact with the upper end of the sliding member, and
wherein, when the sliding member is at the first position, a side surface of the claw of the sliding member in the width direction or the depth direction is brought into contact with a side surface of the projection of the device main body in the width direction or the depth direction, while, when the sliding member is at the second position, the side surface of the claw is brought out of contact with the side surface of the projection of the device main body in the width direction or the depth direction.

2. The electronic device according to claim 1,
wherein the switch door is mounted to the cover main body to be openable obliquely upward about a rotation axis extending in the depth direction or the width direction, and
wherein the sliding member is mounted below the switch door of the cover main body to be slidable from the first position as the lower position toward the second position as the upper position.

3. The electronic device according to claim 1,
wherein the cover further includes a switch extension mounted to the cover main body to extend between the switch window and the power switch and to be displaceable in an operation direction of the power switch, and
wherein the switch extension allows the power switch to be operated from the outside of the cover when the switch door is opened.

4. The electronic device according to claim 1,
wherein the switch door is urged to close, and
wherein the sliding member is urged to stay at the first position.

5. The electronic device according to claim 4,
wherein the switch door is urged to close by its own weight, and
wherein the sliding member is urged to stay at the first position by its own weight.

6. The electronic device according to claim 1, further comprising a cable lead-out portion from which to lead out a cable for electrical connection between the device main body and another electronic device.

7. An information processing apparatus, comprising the electronic device according to claim 1,
wherein the device main body further includes a controller configured to perform information processing,
wherein the controller includes:
a calculator configured to perform arithmetic processing of information;
a storage configured to store at least program software; and
an information input/output unit configured to receive information that has not undergone the arithmetic processing as well as output information that has undergone the arithmetic processing, and
wherein the calculator is configured to perform the arithmetic processing based on the program software stored in the storage.

8. A POS terminal, comprising the information processing apparatus according to claim 7, the POS terminal further comprising a store-clerk display and a customer display.

9. The POS terminal according to claim 8, further comprising a receipt printer and a barcode reader.

10. A method of removing the cover of the electronic device according to claim 1, the method comprising the steps of:
providing the electronic device according to claim 1;
opening the switch door to bring the switch door out of contact with the upper end of the sliding member, to thereby allow the sliding member to slide to the second position;
sliding the sliding member toward the second position to bring the side surface of the claw of the sliding member out of contact with the side surface of the projection of the device main body, to thereby allow the cover main body to slide in the width direction or the depth direction; and sliding the cover main body in the width direction or the depth direction to remove the cover main body from the device main body.

11. The electronic device according to claim 2,
wherein the cover further includes a switch extension mounted to the cover main body to extend between the switch window and the power switch and to be displaceable in an operation direction of the power switch, and
wherein the switch extension allows the power switch to be operated from the outside of the cover when the switch door is opened.

12. The electronic device according to claim 2,
wherein the switch door is urged to close, and
wherein the sliding member is urged to stay at the first position.

13. The electronic device according to claim 12,
wherein the switch door is urged to close by its own weight, and
wherein the sliding member is urged to stay at the first position by its own weight.

14. The electronic device according to claim 3,
wherein the switch door is urged to close, and
wherein the sliding member is urged to stay at the first position.

15. The electronic device according to claim 14,
wherein the switch door is urged to close by its own weight, and
wherein the sliding member is urged to stay at the first position by its own weight.

16. The electronic device according to claim 2, further comprising a cable lead-out portion from which to lead out a cable for electrical connection between the device main body and another electronic device.

17. The electronic device according to claim 3, further comprising a cable lead-out portion from which to lead out a cable for electrical connection between the device main body and another electronic device.

18. The electronic device according to claim 4, further comprising a cable lead-out portion from which to lead out a cable for electrical connection between the device main body and another electronic device.

19. An information processing apparatus, comprising the electronic device according to claim 2,
wherein the device main body further includes a controller configured to perform information processing,
wherein the controller includes:
    a calculator configured to perform arithmetic processing of information;
    a storage configured to store at least program software; and
    an information input/output unit configured to receive information that has not undergone the arithmetic processing as well as output information that has undergone the arithmetic processing, and
wherein the calculator is configured to perform the arithmetic processing based on the program software stored in the storage.

20. A method of removing the cover of the electronic device according to claim 2, the method comprising the steps of:
    providing the electronic device according to claim 2;
    opening the switch door to bring the switch door out of contact with the upper end of the sliding member, to thereby allow the sliding member to slide to the second position;
    sliding the sliding member toward the second position to bring the side surface of the claw of the sliding member out of contact with the side surface of the projection of the device main body, to thereby allow the cover main body to slide in the width direction or the depth direction; and
    sliding the cover main body in the width direction or the depth direction to remove the cover main body from the device main body.

* * * * *